US012725572B2

(12) United States Patent
Zhang

(10) Patent No.: US 12,725,572 B2
(45) Date of Patent: Sep. 1, 2026

(54) GATE DRIVER CIRCUIT, DISPLAY PANEL, AND DISPLAY APPARATUS

(71) Applicant: Wuhan Tianma Microelectronics Co., Ltd., Wuhan (CN)

(72) Inventor: Wenshuai Zhang, Wuhan (CN)

(73) Assignee: Wuhan Tianma Microelectronics Co., Ltd., Wuhan (CN)

( * ) Notice: Subject to any disclaimer, the term of this patent is extended or adjusted under 35 U.S.C. 154(b) by 0 days.

(21) Appl. No.: 19/362,480

(22) Filed: Oct. 20, 2025

(65) Prior Publication Data

US 2026/0179538 A1 Jun. 25, 2026

(30) Foreign Application Priority Data

Dec. 23, 2024 (CN) ........................ 202411907605.9

(51) Int. Cl.
*G09G 3/32* (2016.01)

(52) U.S. Cl.
CPC ....... *G09G 3/32* (2013.01); *G09G 2310/0267* (2013.01); *G09G 2310/08* (2013.01)

(58) Field of Classification Search
CPC ............. G09G 3/32; G09G 2310/0267; G09G 2310/08
See application file for complete search history.

(56) References Cited

U.S. PATENT DOCUMENTS

| | | | | |
|---|---|---|---|---|
| 10,181,279 B2 * | 1/2019 | Shim | ...................... | G11C 19/28 |
| 10,217,432 B2 * | 2/2019 | Park | ...................... | G09G 3/3677 |
| 10,811,114 B2 * | 10/2020 | Yuan | .................... | G09G 3/3258 |
| 2017/0116911 A1 * | 4/2017 | Shim | .................... | G09G 3/2092 |
| 2017/0186394 A1 * | 6/2017 | Park | ...................... | G09G 3/3677 |
| 2019/0164497 A1 * | 5/2019 | Wang | ................... | G09G 3/3266 |
| 2019/0180834 A1 * | 6/2019 | Yuan | .................... | G09G 3/3258 |

FOREIGN PATENT DOCUMENTS

| | | | | |
|---|---|---|---|---|
| EP | 3816984 B1 * | 10/2024 | ............... | G09G 3/20 |
| WO | WO-2020001200 A1 * | 1/2020 | ........... | G09G 3/3674 |

* cited by examiner

*Primary Examiner* — Michael Pervan
(74) *Attorney, Agent, or Firm* — East IP P.C.

(57) ABSTRACT

Provided are a gate driver circuit, a display panel, and a display apparatus. In the gate driver circuit, a first driving circuit outputs a first node signal of a first node and a second node signal of a second node, a first output sub-circuit is electrically connected to a second clock signal terminal and a first output terminal, and a second output sub-circuit is electrically connected to a second level signal terminal and the first output terminal configured to provide a first control signal. A third output sub-circuit is electrically connected to a third clock signal terminal and a second output terminal. A fourth output sub-circuit is electrically connected to a first level signal terminal and the second output terminal. At at least one moment, one of the first and second control signals includes a first level signal, and the other one includes a second level signal.

20 Claims, 29 Drawing Sheets

GATE DRIVER CIRCUIT, DISPLAY PANEL, AND DISPLAY APPARATUS

CROSS-REFERENCE TO RELATED APPLICATION

This application claims priority to Chinese Patent Application No. 202411907605.9, filed on Dec. 23, 2024, which is hereby incorporated by reference in its entirety.

TECHNICAL FIELD

The present disclosure relates to the field of display technology, and particularly, to a gate driver circuit, a display panel, and a display apparatus.

BACKGROUND

In order to control the pixel driver circuit in the display panel, it is necessary to provide the gate driver circuit that is configured to provide the control signal to the pixel driver circuit in the display panel. At present, the gate driver circuit has a relatively complicated structure and needs to occupy a relatively large space in the display panel, which limits the design of the narrow bezel of the display panel.

SUMMARY

Embodiments of the present disclosure provide a gate driver circuit and a display panel, so that the gate driver circuit can be configured to output not only a first control signal but also a second control signal, the area of the gate driver circuit can be reduced, which facilitates the narrow bezel design.

In a first aspect, some embodiments of the present disclosure provide a gate driver circuit. The gate driver circuit includes:

a first driving module electrically connected to a first clock signal terminal, a first input signal terminal, and a first level signal terminal, and configured to output a first node signal of a first node and a second node signal of a second node based on a signal of the first clock signal terminal, a signal of the first input signal terminal, and a signal of the first level signal terminal;

a first output module including a first output sub-module, a second output sub-module, and a first output terminal, the first output sub-module being configured to receive the first node signal and being electrically connected to a second clock signal terminal and the first output terminal, the second output sub-module being configured to receive the second node signal and being electrically connected to a second level signal terminal and the first output terminal, and the first output terminal being configured to provide a first control signal; and a second output module including a third output sub-module, a fourth output sub-module, and a second output terminal, the third output sub-module being configured to receive a third node signal of a third node and being electrically connected to a third clock signal terminal and the second output terminal, the fourth output sub-module being configured to receive a fourth node signal of a fourth node and being electrically connected to the first level signal terminal and the second output terminal, and the second output terminal being configured to provide a second control signal, where at at least one moment, one of the first control signal and the second control signal includes a first level signal, and the other of the first control signal and the second control signal includes a second level signal.

In a second aspect, some embodiments of the present disclosure provide a display panel including a pixel driver circuit and the above gate driver circuit. The pixel driver circuit includes a driving transistor, a first pixel transistor electrically connected to a first electrode of the driving transistor, and a second pixel transistor electrically connected to a gate of the driving transistor. The first pixel transistor includes a P-type transistor, and the second pixel transistor includes an N-type transistor. A gate of the first pixel transistor is configured to receive the first control signal, and a gate of the second pixel transistor is configured to receive the second control signal.

In a third aspect, some embodiments of the present disclosure provide a display apparatus including the above display panel.

BRIEF DESCRIPTION OF THE DRAWINGS

In order to illustrate technical solutions of embodiments of the present disclosure more clearly, the drawings to be used in the embodiments will be introduced briefly below. Obviously, the drawings in the following description are merely some of the embodiments of the present disclosure, and for those of ordinary skill in the art, other drawings can be obtained based on these drawings without creative effort.

DETAILED DESCRIPTION

In order to better understand the technical solutions of the present disclosure, some embodiments of the present disclosure will be described in detail below with reference to the drawings.

It should be clear that, the embodiments described are merely a part but not all of the embodiments of the present disclosure. Based on the embodiments of the present disclosure, all other embodiments obtained by those of ordinary skill in the art without creative effort fall within the protection scope of the present disclosure.

The terms used in the embodiments of the present disclosure are for the purpose of describing particular embodiments only and are not intended to limit the present disclosure. Unless the context clearly indicates, the singular forms "a", "said", and "the" used in the embodiments and the appended claims of the present disclosure are also intended to include plural forms.

It should be understood the term "and/or" used herein refers to only an association relationship for describing associated objects, and means that there can be three kinds of relationships. For example, "A and/or B" can represent three cases including: "A alone", "A and B", and "B alone". In addition, the character "/" herein generally indicates that the associated objects have an "or" relationship.

Figure 1:
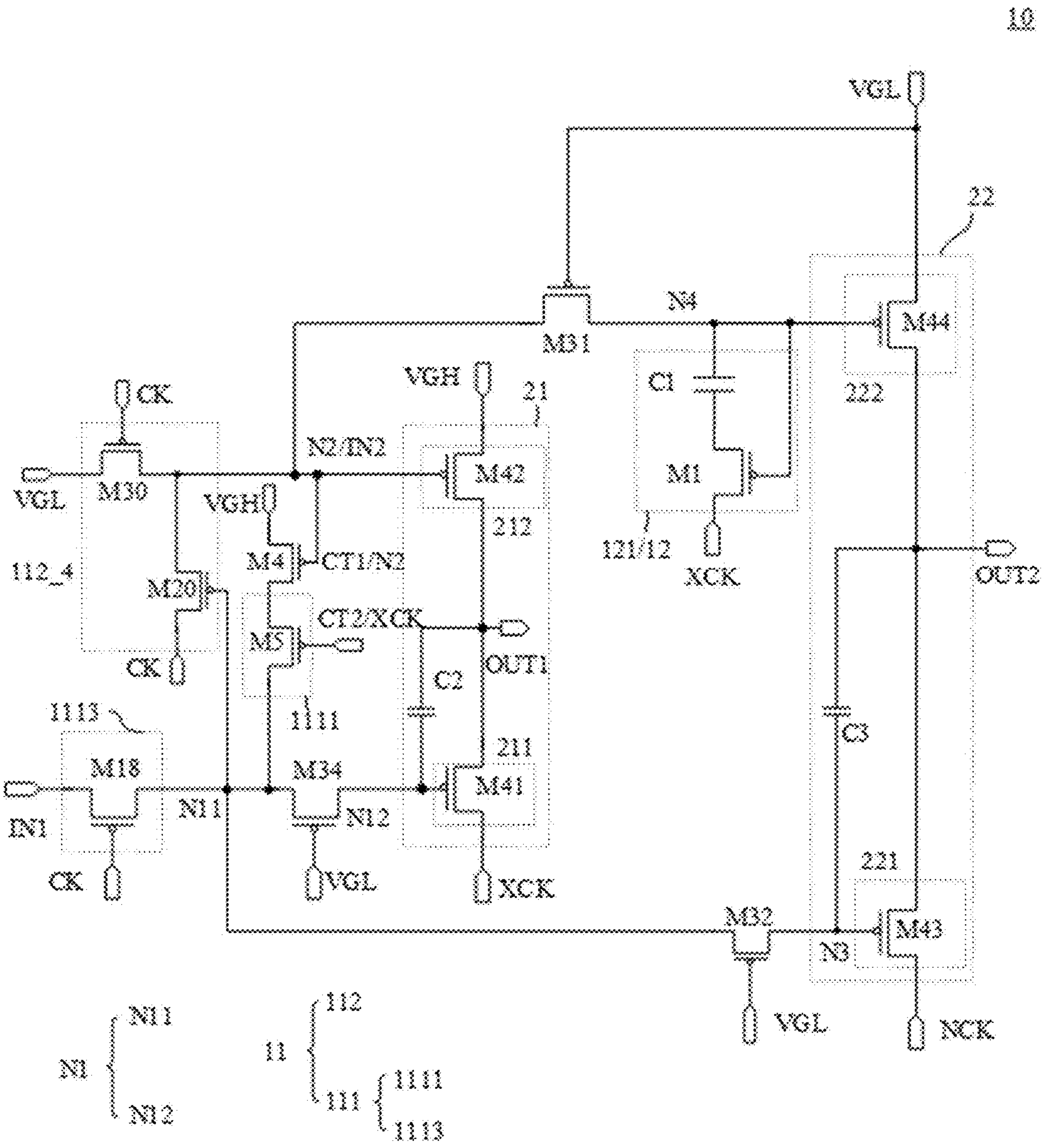
FIG. 1 is a schematic diagram of a gate driver circuit according to some embodiments of the present disclosure.
Figure 2:
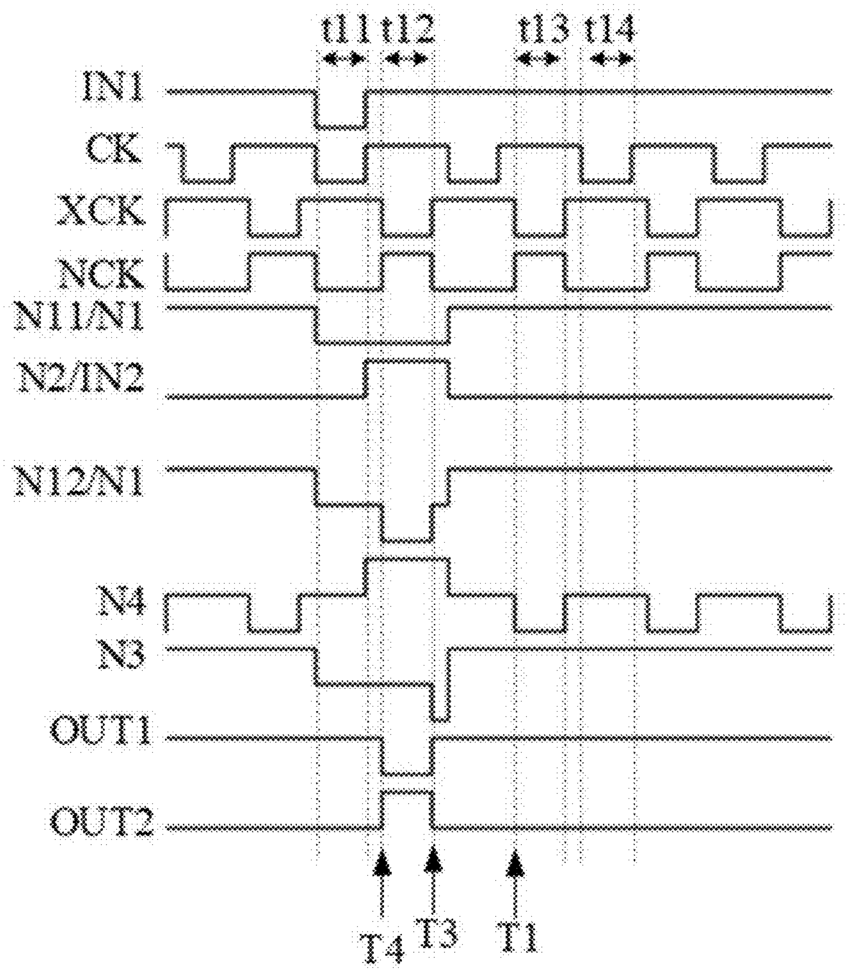
FIG. 2 is a schematic diagram of an operating timing corresponding to FIG. 1.

Some embodiments of the present disclosure provide a gate driver circuit, as shown in FIG. 1 and FIG. 2 that are respectively a schematic diagram of a gate driver circuit according to some embodiments of the present disclosure and a schematic diagram of an operating timing corresponding to FIG. 1, the gate driver circuit 10 includes a first driving module 11, a first output module 21, and a second output module 22.

The first driving module 11 is electrically connected to a first clock signal terminal CK, a first input signal terminal IN1, and a first level signal terminal VGL, and is configured to provide a first node signal to a first node N1 and provide a second node signal to a second node N2 based on a signal of the first clock signal terminal CK and a signal of the first input signal terminal IN1.

The first output module 21 includes a first output sub-module 211, a second output sub-module 212, and a first output terminal OUT1. Under control of the first node signal, the first output sub-module 211 is electrically connected to a second clock signal terminal XCK and the first output terminal OUT1. Under control of the second node signal, the second output sub-module is electrically connected to a second level signal terminal VGH and the first output terminal OUT1. The first output terminal OUT1 is configured to provide a first control signal.

The second output module 22 includes a third output sub-module 221, a fourth output sub-module 222, and a second output terminal OUT2. Under control of a third node signal of a third node N3, the third output sub-module 221 is electrically connected to a third clock signal terminal NCK and the second output terminal OUT2. Under control of a fourth node signal of a fourth node N4, the fourth output sub-module 222 is electrically connected to the first level signal terminal VGL and the second output terminal OUT2. The second output terminal OUT2 is configured to provide a second control signal.

In the embodiments of the present disclosure, the signal provided by the first level signal terminal VGL and the signal provided by the second level signal terminal VGH each are a constant signal. The first level signal terminal VGL is configured to provide the first level signal, the second level signal terminal VGH is configured to provide the second level signal, and the first level signal has a voltage value smaller than a voltage value of the second level signal.

As shown in FIG. 2, the signal provided by the first clock signal terminal CK, the signal provided by the second clock signal terminal XCK, and the signal provided by the third clock signal terminal NCK are all pulse signals that can be switched between the first level signal and the second level signal. Further, the signal provided by the first clock signal terminal CK and the signal provided by the second clock signal terminal XCK can be pulse signals having a phase difference and have a same pulse width for a low-level.

Exemplarily, the first level signal provided by the first clock signal terminal CK can have a pulse width smaller than or equal to a pulse width of the second level signal. The first level signal provided by the second clock signal terminal XCK can have a pulse width smaller than or equal to the pulse width of the second level signal. The first level signal provided by the third clock signal terminal NCK can have a pulse width greater than or equal to the pulse width of the second level signal.

FIG. 2 illustrates that the pulse width of the first level signal provided by the first clock signal terminal CK is smaller than the pulse width of the second level signal, the pulse width of the first level signal provided by the second clock signal terminal XCK is smaller than the pulse width of the second level signal, and the pulse width of the first level signal provided by the third clock signal terminal NCK is greater than the pulse width of the second level signal.

In the embodiments of the present disclosure, at at least one moment, one of the first control signal and the second control signal includes the first level signal, and the other of the first control signal and the second control signal includes the second level signal.

In an optional embodiment, an enable level of the first control signal has a potential different from a potential of an enable level of the second control signal. For example, the enable level of the first control signal can be the first level signal, and the enable level of the second control signal can be the second level signal. A moment when one of the first control signal and the second control signal includes the first level signal and the other of the first control signal and the second control signal is a moment when the first control signal and the second control signal output their respective enable levels. As shown FIG. 2, during a second period t12, the first output terminal OUT1 is configured to output the enable level of the first control signal, that is, the first level signal; and the second output terminal OUT2 is configured to output the enable level of the second control signal, that is, the second level signal.

In this case, the first control signal and the second control signal can be used to control the transistors with different channel types in the pixel driver circuit.

Figure 3:
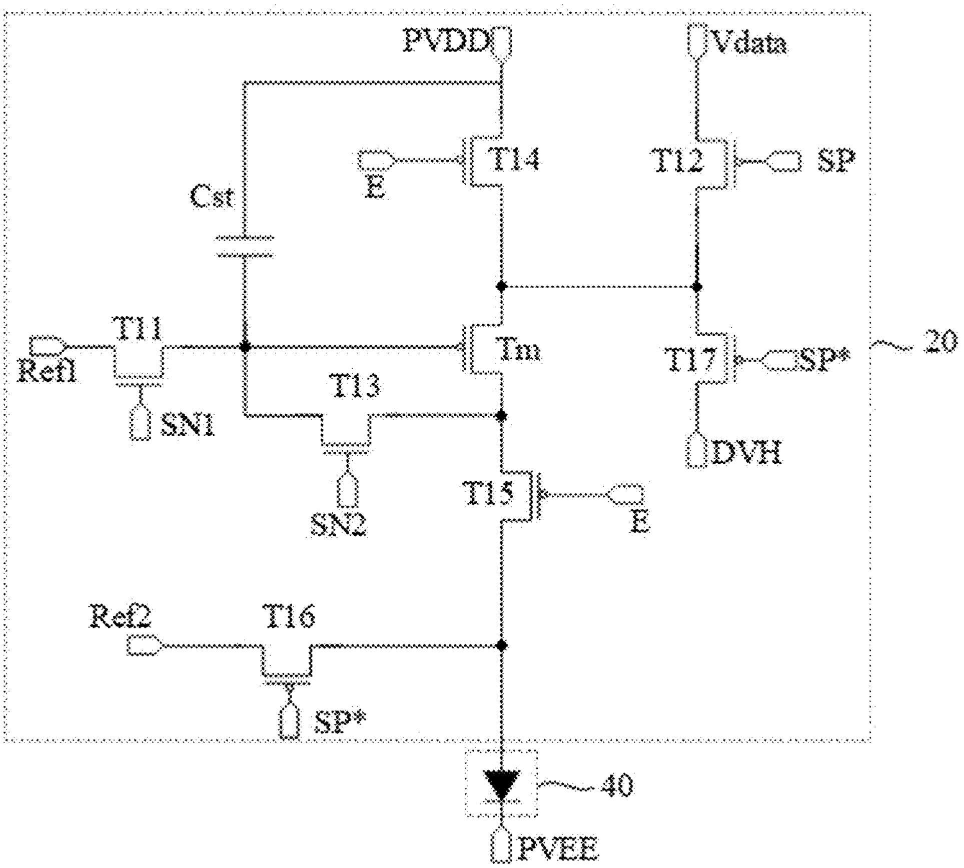
FIG. 3 is a schematic diagram of a pixel driver circuit according to some embodiments of the present disclosure.
Figure 4A:
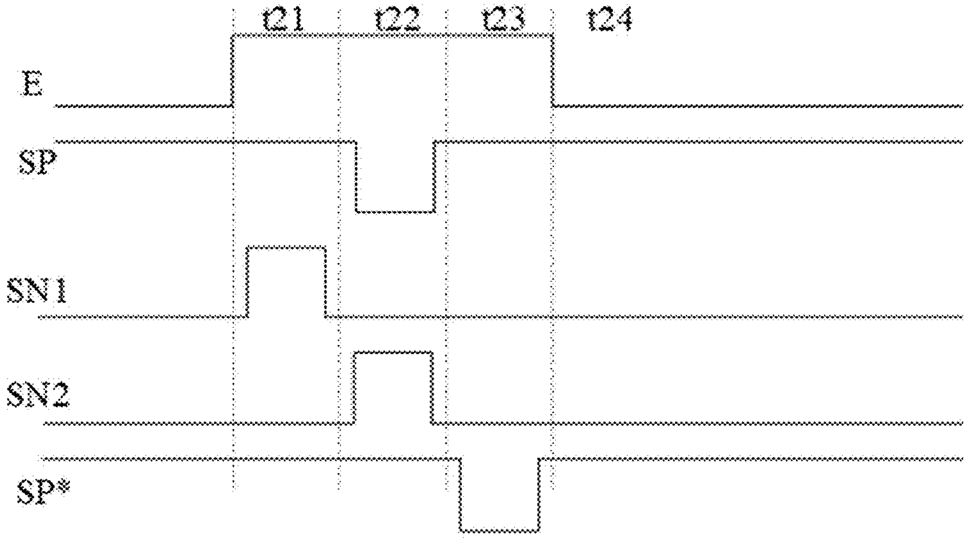
FIG. 4A is a schematic diagram of an operating timing corresponding to FIG. 3.

Optionally, with reference to FIG. 3 and FIG. 4A that are respectively a schematic diagram of a pixel driver circuit 20 according to some embodiments of the present disclosure and a schematic diagram of an operating timing corresponding to FIG. 3, the pixel driver circuit 20 includes a storage capacitor Cst, a driving transistor Tm, a gate reset transistor T11, a data writing transistor T12, a threshold compensation transistor T13, a first light-emitting control transistor T14, a second light-emitting control transistor T15, an anode reset transistor T16, and a bias adjustment transistor T17.

Optionally, the threshold compensation transistor T13 and the gate reset transistor T11 that are electrically connected to a gate of the driving transistor Tm each include an N-type transistor, for example, an oxide transistor, to reduce a leakage current of the gate of the driving transistor Tm. The data writing transistor T12 includes a P-type transistor, for example, a low-temperature polysilicon transistor.

When the pixel driver circuit 20 operates, as shown in FIG. 4A, an operation process of the pixel driver circuit 20 includes a gate reset period t21, a data writing period t22, a bias adjustment period t23, and a light-emitting period t24.

During the gate reset period t21, a first scanning control terminal SN1 transmits an enable signal, and the gate reset transistor T11 is turned on. A first reset signal provided by the first reset signal terminal resets the gate of the driving transistor Tm through the gate reset transistor T11.

During the data writing period t22, a second scanning control terminal SP transmits an enable signal, and the data writing transistor T12 is turned on; a third scanning control terminal SN2 transmits an enable signal, and the threshold compensation transistor T13 is turned on; a signal of a data signal terminal Vdata charges the gate of the driving transistor Tm through the driving transistor Tm and the threshold compensation transistor T13 until a potential Vg of the gate of the driving transistor Tm changes to Vg=Vdata−|Vth|, where Vth denotes a threshold voltage of the driving transistor Tm, so that data writing and threshold compensation are completed.

During the bias adjustment period t23, an adjustment control terminal SP* transmits an enable signal, and the bias adjustment transistor T17 and the anode reset transistor T16 are turned on. During this period, a bias adjustment signal provided by an adjustment signal terminal DVH is written to a first electrode of the driving transistor Tm through the bias adjustment transistor T17. A second reset signal provided by a second reset signal terminal Ref2 resets a light-emitting element 40 through the anode reset transistor T16.

During the light-emitting period t24, a light-emitting control signal terminal E transmits an enable signal, the first light-emitting control transistor T14 and the second light-emitting control transistor T15 are turned on, and a first power supply voltage signal PVDD is written to the first electrode of the driving transistor Tm. The potential of the gate of the driving transistor Tm maintain Vg=Vdata−|Vth| under the action of the storage capacitor Cst. A potential Vs of the first electrode of the driving transistor Tm satisfies Vs=VPVDD, where VPVDD denotes a potential of the first power supply voltage signal PVDD. The driving transistor Tm is turned on, and a current controlled by the potential of the gate of the driving transistor Tm flows through the light-emitting element 40 to light the light-emitting element 40.

Figure 4B:
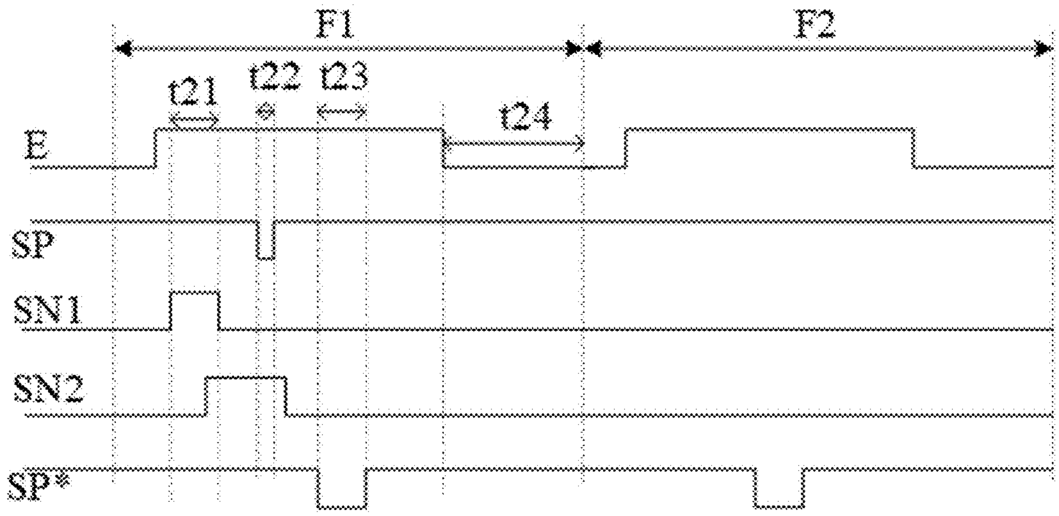
FIG. 4B is another schematic diagram of an operating timing corresponding to FIG. 3.

It should be noted that, the operating timing of the gate driver circuit 10 shown in FIG. 4A is only an example. In another optional embodiment, as shown in FIG. 4B that is another schematic diagram of an operating timing corresponding to FIG. 3, the operation process of the gate driver circuit 10 includes a data writing frame F1 and a data holding frame F2. The data writing frame F1 includes the gate reset period t21, the data writing period t22, the bias adjustment period t23, and the light-emitting period t24. In the data holding frame F2, the first scanning control terminal SN1, the second scanning control terminal SP, and the third scanning control terminal SN2 can be configured to provide only the disable levels.

Optionally, as shown in FIG. 4B, the pulse width of the enable level of the third scanning control terminal SN2 can be greater than the pulse width of the enable level of the second scanning control terminal SP, to improve a bias characteristic of the driving transistor Tm.

Exemplarily, as shown in FIG. 4B, the enable level of the first scanning control terminal SN1 and the enable level of the third scanning control terminal SN2 can at least partially overlap. In the overlapping period of the enable level of the first scanning control terminal SN1 and the enable level of the third scanning control terminal SN2, the gate reset transistor T11 and the threshold compensation transistor T13 are both turned on.

In the embodiments of the present disclosure, the first control signal output by the gate driver circuit 10 can be a signal for controlling the first pixel transistor in the pixel driver circuit 20 to be turned on, and the second control signal output by the gate driver circuit 10 can be a signal for controlling the second pixel transistor in the pixel driver circuit 20 to be turned on. The first pixel transistor includes a P-type transistor which is cut off under a high-level control signal and turned on under a low-level control signal. The second pixel transistor includes an N-type transistor which is turned on under a high-level control signal and cut off under a low-level control signal. Optionally, the first pixel transistor includes the data writing transistor T12 in the pixel driver circuit shown in FIG. 3, and the second pixel transistor includes the threshold compensation transistor T13 or the gate reset transistor T11 in the pixel driver circuit shown in FIG. 3.

For example, the period when the enable level of the first control signal and the enable level of the second control signal overlap can be a period when the pixel driver circuit 20 electrically connected to the gate driver circuit 10 is scanned. When the display panel displays images, based on a scanning order of the display panel, a plurality of pixel driver circuit rows in the display panel are scanned row by row to perform operations such as writing of the data voltage and the threshold compensation row by row. The period when the pixel driver circuit 20 is scanned refers to a period when the pixel driver circuit 20 is selected to perform operations such as data voltage writing and the threshold compensation.

Alternatively, in another optional embodiment, the enable level of the first control signal and the enable level of the second control signal have a same potential. For example, the enable level of the first control signal can be the first level signal, and the enable level of the second control signal can also be the first level signal. The moment when one of the first control signal and the second control signal includes the first level signal and the other of the first control signal and the second control signal includes the second level signal is a moment when one of the first control signal and the second control signal outputs the enable level and the other of the first control signal and the second control signal outputs the disable level. As shown in FIG. 2, during the second period t12, the first output terminal OUT1 outputs the enable level of the first control signal, that is, the first level signal; and the second output terminal OUT2 outputs the disable level of the second control signal, that is, the second level signal.

In this case, the first control signal and the second control signal can be used to control the transistors with a same channel type in the pixel driver circuit.

For example, the first control signal can be a signal for controlling the data writing transistor T12 in the pixel driver circuit 20 shown in FIG. 3 to be turned on, and the second control signal can be a signal for controlling the first light-emitting control transistor T14 or the second light-emitting control transistor T15 in the pixel driver circuit 20 shown in FIG. 3 to be turned on.

Hereinafter, unless otherwise specified, the example is given for illustration in which the enable level of the first control signal and the enable level of the second control signal have different potentials, and the first control signal and the second control signal control the transistors with different channel types in the pixel driver circuit.

When the gate driver circuit 10 operates, as shown in FIG. 1 and FIG. 2, the operation process of the gate driver circuit 10 includes at least a first period t11 and the second period t12.

During the first period t11, the first clock signal terminal CK provides an enable level, the enable level refers to a signal which can control the transistor having the gate electrically connected to the first clock signal terminal CK in the gate driver circuit 10 to be turned on, and FIG. 2 illustrates that the enable level is the first level signal; the first input signal terminal IN1 provides an enable level, the enable level refers to a signal which can control the transistor having the gate electrically connected to the first node N1 in the first output sub-module 211 to be turned on, and FIG. 2 illustrates that the enable level is the first level signal, and the first node signal of the first node N1 is the enable level, that is, the first level signal. During the first period t11, the second clock signal terminal XCK provides the second level signal, and the third clock signal terminal NCK provides the first level signal.

During the second period t12, the first clock signal terminal CK provides a disable level, and the disable level refers to a signal which can control the transistor having the gate electrically connected to the first clock signal terminal CK in the gate driver circuit 10 to be turned off; FIG. 2 illustrates that the disable level is the second level signal.

Further, during the second period t12, the second clock signal terminal XCK provides an enable level, the enable level refers to a level which can control the first pixel transistor in the pixel driver circuit 20 electrically connected to the first output terminal OUT1 to be turned on. For example, the first pixel transistor includes the data writing transistor T12 in the pixel driver circuit 20 shown in FIG. 3, and FIG. 2 illustrates that the enable level is the first level signal.

Further, during the second period t12, the third clock signal terminal NCK provides an enable level, the enable level refers to a level which can control the second pixel transistor in the pixel driver circuit 20 electrically connected to the second output terminal OUT2 to be turned on. For example, the second pixel transistor includes the gate reset transistor T11 and the threshold compensation transistor T13 in the pixel driver circuit 20 shown in FIG. 3, and FIG. 2 illustrates that the enable level is the second level signal.

As shown in FIG. 2, during the second period t12, the first node signal of the first node N1 is still the enable level. The first output sub-module 211 is turned on under control of the first node N1, and the enable level provided by the second clock signal terminal XCK is written to the first output terminal OUT1 through the first output sub-module 221, so that the first output terminal OUT1 outputs the first control signal. Under the action of the first control signal, the first pixel transistor in the pixel driver circuit 20 electrically connected to the first output terminal OUT1 is turned on.

Further, during the second period t12, the third node signal of the third node N3 is an enable level, which indicates that the third node signal is a level that can control the third output sub-module 221 to be turned on to electrically connect the third clock signal terminal NCK and the second output terminal OUT2; FIG. 2 illustrates that the enable level is a low level. The third output sub-module 221 is turned on under control of the third node N3, and the enable level provided by the third clock signal terminal NCK is written to the second output terminal OUT2 through the third output sub-module 221, so that the second output terminal OUT2 outputs the second control signal. Under the action of the second control signal, the second pixel transistor in the pixel driver circuit 20 electrically connected to the second output terminal OUT2 is turned on.

Further, during the second period t12, the second node signal of the second node N2 is a disable level, and the disable level refers to a level which can control the second output sub-module 212 to be turned off to be disconnect the second level signal terminal VGH from the first output terminal OUT1; and FIG. 2 illustrates that the disable level is the high level.

Further, during the second period t12, the fourth node N4 is at a disable level, and the disable level refers to the level which can control the fourth output sub-module 222 to be turned off to be disconnect the first level signal terminal VGL from the second output terminal OUT2; and FIG. 2 illustrates that the disable level is a high level.

The gate driver circuit 10 according to the embodiments of the present disclosure can be configured to output the first control signal through the first output terminal OUT1 and output the second control signal through the second output terminal OUT2, and there is no need to provide two gate driver circuits 10 for the first control signal and the second control signal, respectively, which facilitates reduction of an area of the gate driver circuit 10, and facilitates reduction of the area of the non-display region occupied by the gate driver circuit 10 when the gate driver circuit is applied to the display panel, to increase the screen ratio of the display panel.

For example, the first control signal and the second control signal can be control signals for controlling the transistors with two different channel types in the pixel driver circuit 20, respectively.

Figure 5:
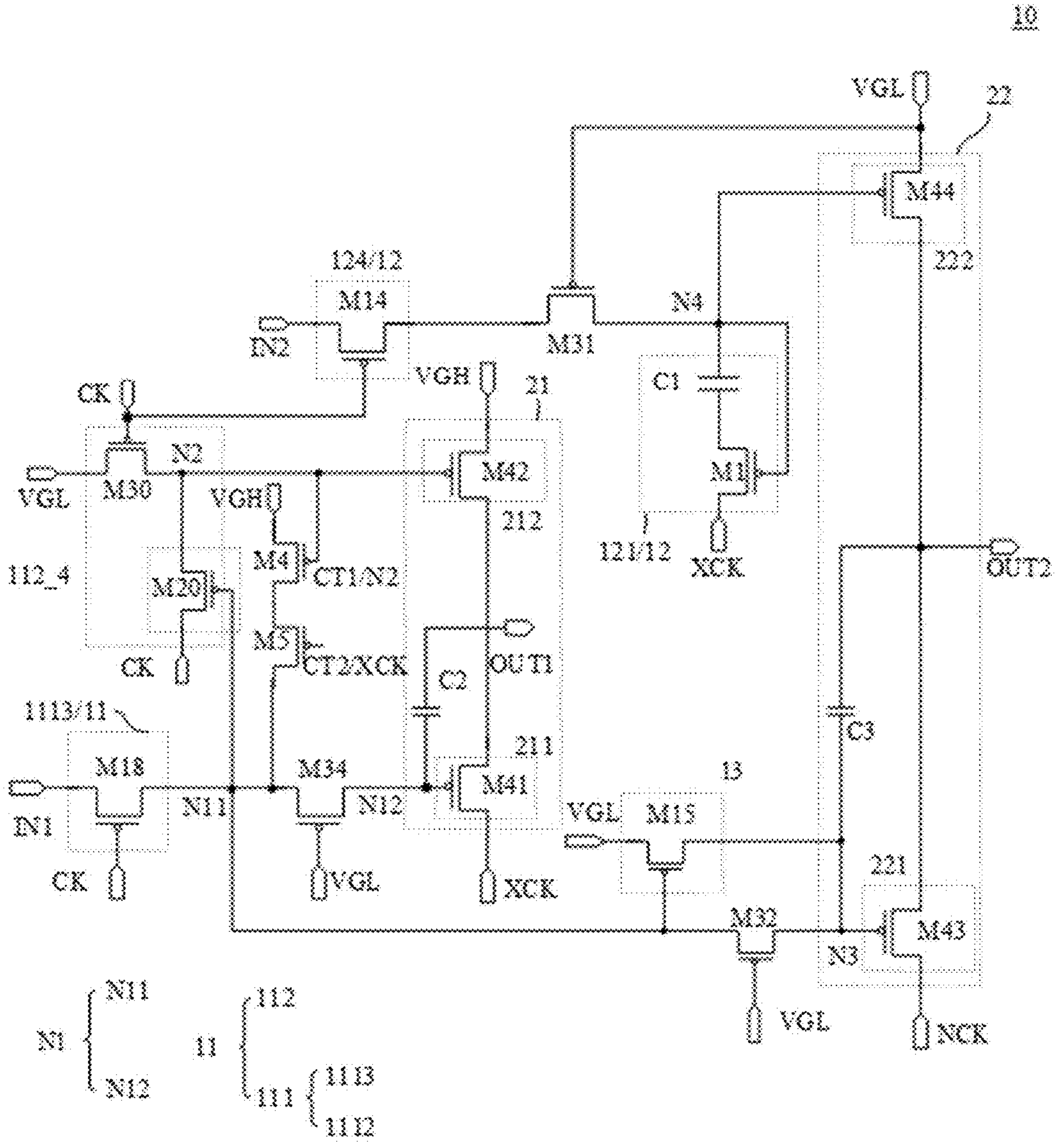
FIG. 5 is another schematic diagram of a gate driver circuit according to some embodiments of the present disclosure.

Exemplarily, as shown in FIG. 1 and FIG. 5 that is another schematic diagram of a gate driver circuit according to some embodiments of the present disclosure, the gate driver circuit 10 includes a second driving module 12 electrically connected to a second input signal terminal IN2 and the fourth node N4, the second input signal terminal IN2 is configured to set the fourth node signal of the fourth node N4 to be a disable level at least during the second period t12, and under the action of the disable level, the fourth output sub-module 222 is turned off to prevent the first level signal provided by the first level signal terminal VGL from being output to the second output terminal OUT2 during the second period t12.

In the embodiments of the present disclosure, the second input signal terminal IN2 can be implemented in various manners, as shown in FIG. 1, in the embodiments of the present disclosure, the fourth node N4 can be electrically connected to the second node N2, that is, the second node N2 can be reused as the second input signal terminal IN2.

Alternatively, as shown in FIG. 5, in the embodiments of the present disclosure, the fourth node N4 can be electrically connected to the second input signal terminal IN2 through the fourth signal writing unit 124. It can be seen from FIG. 5 and FIG. 6 that is a schematic diagram of an operating timing corresponding to FIG. 5, the second input signal terminal IN2 is configured to provide the second level signal at least during the second period t12, and the second level signal is the disable level which can control the fourth output sub-module 222 to be turned off. The specific operation process of the gate driver circuit 10 shown in FIG. 1 and FIG. 5 will be described below, which is not repeated herein.

Exemplarily, as shown in FIG. 1 and FIG. 5, the second driving module 12 includes a first adjustment unit 121; and during at least part of a period when the second control signal is the disable level, the first adjustment unit 121 sets a voltage value of the fourth node signal of the fourth node N4 to be smaller than a voltage value of the first level signal of the first level signal terminal VGL.

Figure 6:
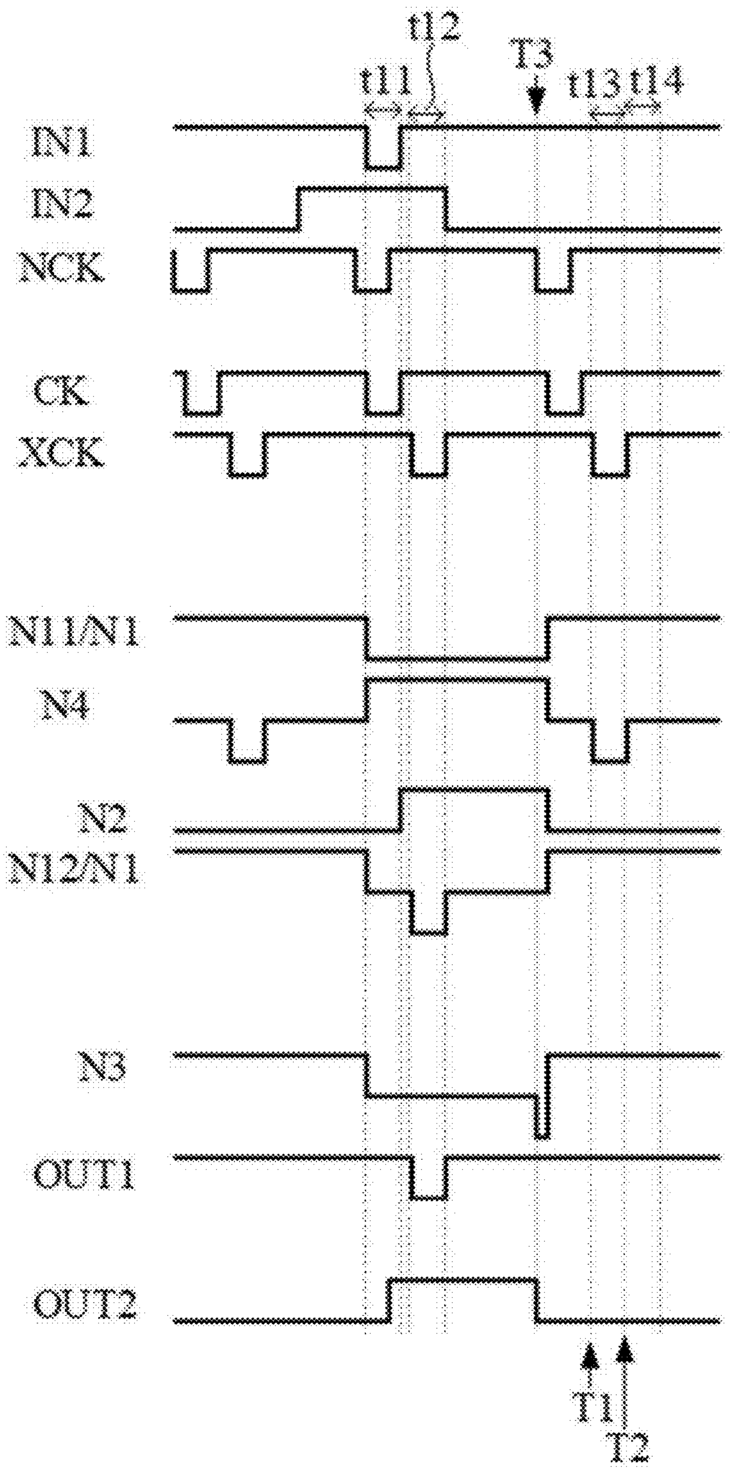
FIG. 6 is a schematic diagram of an operating timing corresponding to FIG. 5.

As shown FIG. 2 and FIG. 6, the operation process of the gate driver circuit 10 further includes a third period t13. During the third period t13, the first control signal output by the first output terminal OUT1 can be a disable level, and the second control signal output by the second output terminal OUT2 can also be a disable level. That is, the pixel driver circuit row electrically connected to the gate driver circuit 10 in the display panel is during a period when the pixel driver circuit row is not scanned.

In the embodiments of the present disclosure, the first adjustment unit 121 is configured to set the voltage value of the fourth node signal of the fourth node N4 to be smaller than the voltage value of the first level signal of the first level signal terminal VGL at least during the third period t13, and the fourth node signal of the fourth node N4 is defined as a third level signal during the third period t13. That is, a voltage value of the third level signal is smaller than the voltage value of the first level signal. Under the action of the third level signal, the fourth output sub-module 222 can be stably turned on, so that the low level provided by the first level signal terminal VGL can be stably output to the second output terminal OUT2.

Exemplarily, as shown in FIG. 1 and FIG. 5, the first adjustment unit 121 includes a first capacitor C1 and a first transistor M1, the first transistor M1 is electrically connected between a first electrode plate of the first capacitor C1 and the second clock signal terminal XCK, and has a gate electrically connected to the fourth node N4.

Under control of the fourth node signal of the fourth node N4, the first transistor M1 is electrically connected to the second clock signal terminal XCK and the first electrode plate of the first capacitor C1. A second electrode plate of the first capacitor C1 is electrically connected to the fourth node N4.

Exemplarily, as shown in FIG. 1 and FIG. 5, the first transistor M1 includes a P-type transistor.

When the gate driver circuit 10 operates, with reference to FIG. 2 and FIG. 6, during at least part of the period when the second input signal terminal IN2 provides an enable level, the enable level refers to a signal which can control the fourth output sub-module 222 to be turned on. For example, when the fourth output sub-module 222 includes the P-type transistor, the enable level can be the first level signal, that is, during the third periods t13 and the fourth periods t14 shown in FIG. 2 and FIG. 6, the first level signal is written to the fourth node N4 via the second input signal terminal IN2 to control the first transistor M1 to be turned on, and the signal of the second clock signal terminal XCK is written to the first electrode plate of the first capacitor C1 through the first transistor M1 which is turned on to charge the first electrode plate of the first capacitor C1.

When the signal of the second clock signal terminal XCK jumps from the second level signal to the first level signal, that is, at a moment T1 shown in each of FIG. 2 and FIG. 6, under a coupling action of the first capacitor C1, the fourth node signal of the fourth node N4 jumps from the first level signal to the third level signal, so as to control the signal provided by the first level signal terminal VGL to be stably output via the fourth output sub-module 222.

Figure 7:
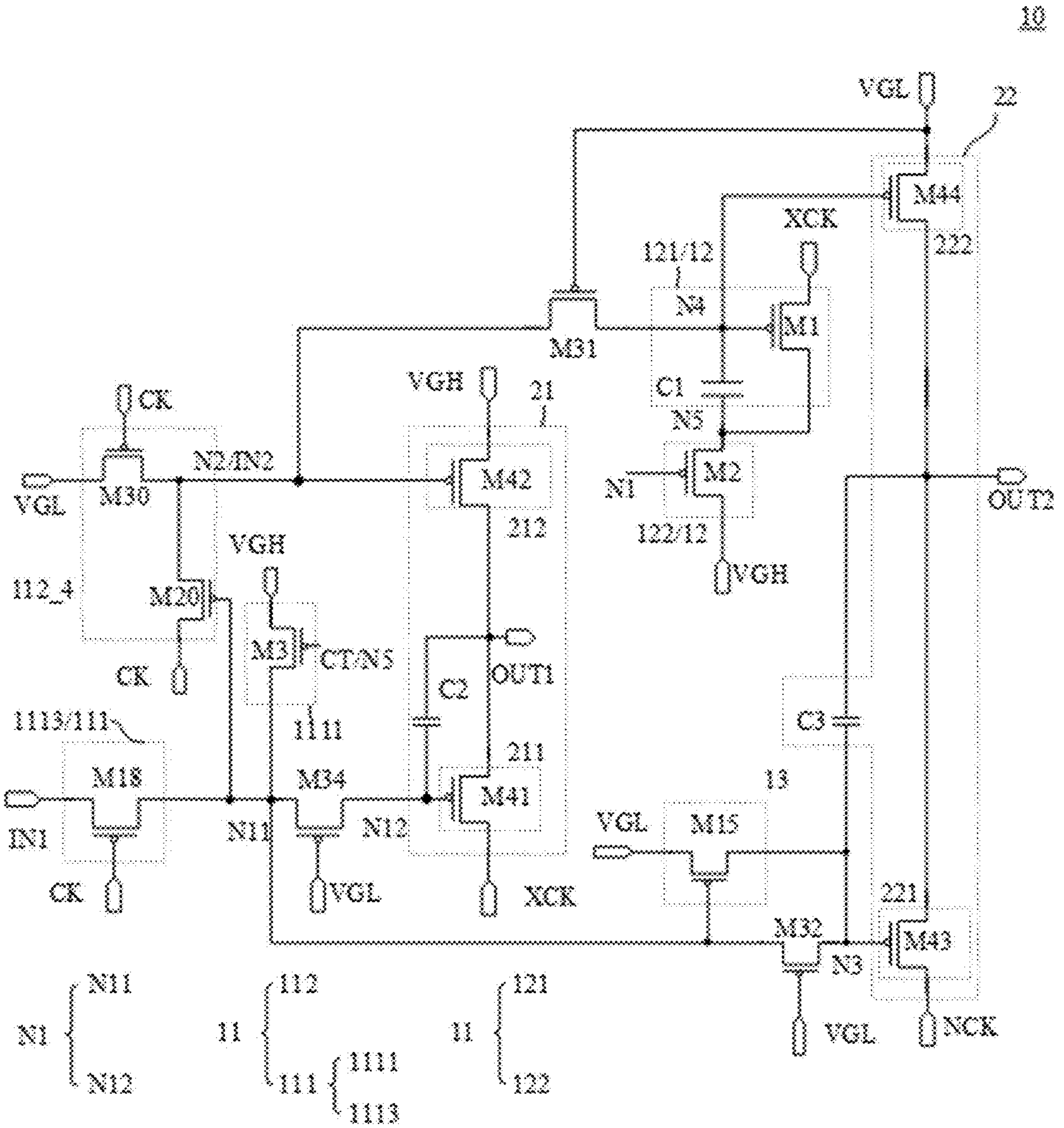
FIG. 7 is another schematic diagram of a gate driver circuit according to some embodiments of the present disclosure.
Figure 8:
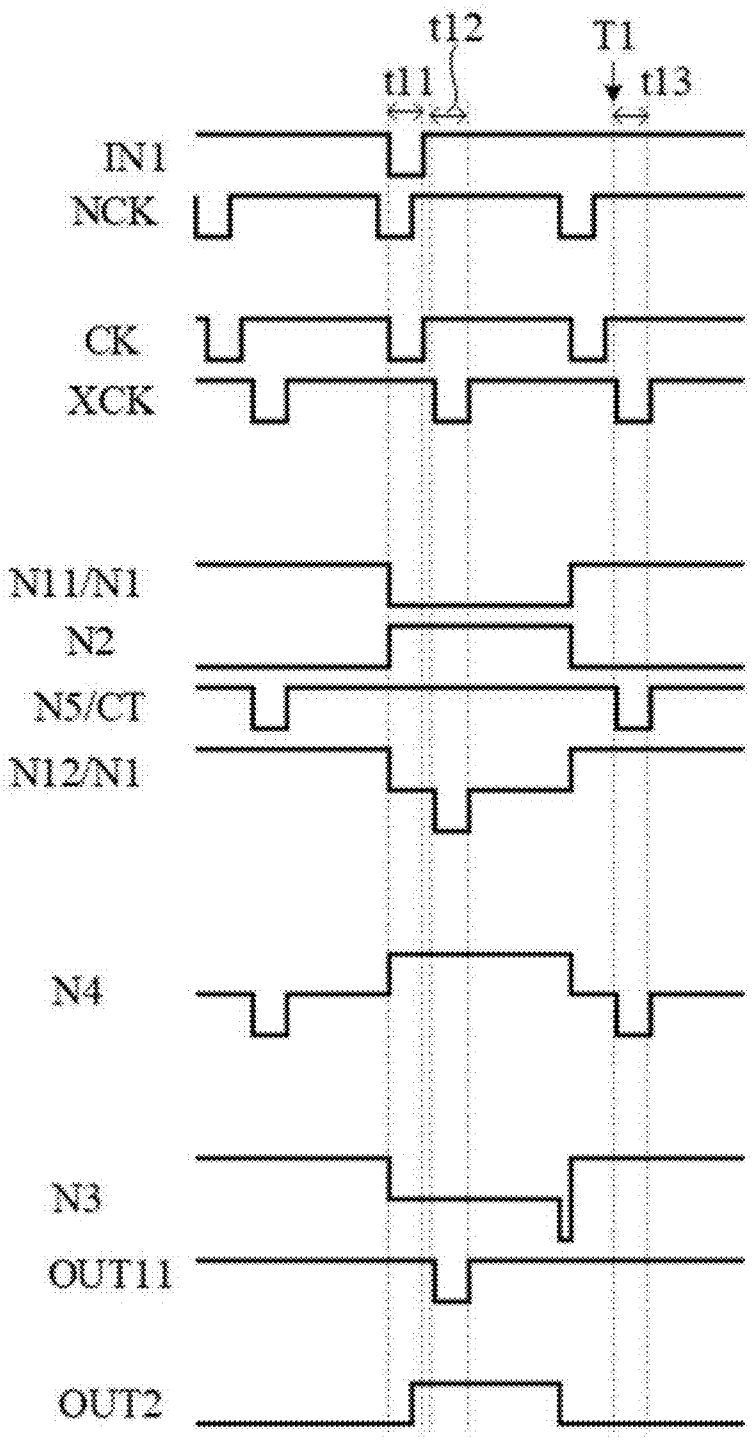
FIG. 8 is a schematic diagram of an operating timing corresponding to FIG. 7.

Optionally, as shown in FIG. 7 and FIG. 8 that are respectively another schematic diagram of a gate driver circuit according to some embodiments of the present disclosure and a schematic diagram of an operating timing corresponding to FIG. 7, in addition to the first adjustment unit 121, in some embodiments of the present disclosure, a second adjustment unit 122 can be provided in the second driving module 12, and the second adjustment unit 122 is electrically connected to the first node N1, the second level signal terminal VGH, and the first electrode plate of the first capacitor C1, and is configured to charge the first electrode plate of the first capacitor C1 based on the first node signal of the first node N1 and the second level signal of the second level signal terminal VGH.

Based on such configuration, as shown in FIG. 8, when the first node N1 provides an enable level, for example, the first level signal, the second adjustment unit 122 is turned on and can write the second level signal to the first electrode plate of the first capacitor C1.

Exemplarily, as shown in FIG. 7, the second adjustment unit 122 includes a second transistor M2, and the second transistor M2 is connected between the second level signal terminal VGH and the first electrode plate of the first capacitor C1 and has a gate connected to the first node N1.

Exemplarily, the second transistor M2 includes a P-type transistor; when the first node N1 provides the first level signal, the second transistor M2 is turned on, and the second level signal provided by the second level signal terminal VGH is written to the first electrode plate of the first capacitor C1 to stabilize a potential of the first electrode plate of the first capacitor C1.

Exemplarily, as shown in FIG. 7, the first driving module 11 includes a first signal writing unit 111 including a first sub-unit 1111, and the first sub-unit 1111 is electrically connected to a second level signal terminal VGH and a first control terminal CT, and is configured to output the first node signal of the first node N1 based on the second level signal of the second level signal terminal VGH and a signal of the first control terminal CT. In other words, under control of the first control terminal CT, the first sub-unit 1111 is electrically connected to the second level signal terminal VGH and the first node N1.

As shown in FIG. 8, a signal of the first control terminal CT is the first level signal during the third period t13, and is the second level signal during both the first period t11 and the second period t12. Therefore, during the third period t13, the first control terminal CT can be configured to control the first sub-unit 1111 to be turned on, so that the second level signal provided by the second level signal terminal VGH is written to the first node N1 to control the first output sub-module 211 to be turned off.

Optionally, as shown in FIG. 7, the first electrode plate of the first capacitor C1 is electrically connected to a fifth node N5, and the first control terminal CT is electrically connected to the fifth node N5. As shown in FIG. 8, the fifth node N5 is at the first level signal during the third period t13. Therefore, based on such configuration, the first sub-unit 1111 can be configured to stably write the second level signal to the first node N1 during the third period t13, so that the first output sub-module 211 can be controlled to be cut off during the third period t13, preventing a false output of the first output terminal OUT1. Further, based on such configuration, there is no need to provide a new control terminal, which facilitates reduction of the signal types required for the gate driver circuit 10, and simplifies the structure of the gate driver circuit 10.

Exemplarily, as shown in FIG. 7, the first sub-unit 1111 includes a third transistor M3, and the third transistor M3 is electrically connected between the second level signal terminal VGH and the first node N1 and has a gate connected to the fifth node N5.

Optionally, the third transistor M3 includes a P-type transistor, and when the fifth node N5 provides the first level signal, the third transistor M3 is turned on, and the second level signal provided by the second level signal terminal VGH is written to the first node N1.

Alternatively, as shown in FIG. 1, the first control terminal CT includes a first control sub-terminal CT1 and a second control sub-terminal CT2, the first control sub-terminal CT1 is electrically connected to the second node N2, and the second control sub-terminal CT2 is electrically connected to the second clock signal terminal XCK.

Optionally, as shown in FIG. 1, in the embodiments of the present disclosure, the first sub-unit 1111 can include a fourth transistor M4 and a fifth transistor M5, the fourth transistor M4 is electrically connected between the second level signal terminal VGH and the fifth transistor M5 and has a gate electrically connected to the first control sub-terminal CT1, and the fifth transistor M5 is electrically connected between the fourth transistor M4 and the first node N1 and has a gate electrically connected to the second control sub-terminal CT2.

Based on such configuration, as shown FIG. 2, when the second node N2 and the second clock signal terminal XCK each provide an enable level, for example, the fourth transistor M4 and the fifth transistor M5 each are a P-type transistor, the enable level is the first level signal, that is, at least during the third period t13 shown in FIG. 2, the second level signal provided by the second level signal terminal VGH can be written to the first node N1 through the fourth transistor M4 and the fifth transistor M5 which are turned on, so that the first node N1 can be stably maintained at the second level signal, thereby controlling the first output sub-module 211 to be turned off, and preventing the false output of the first output terminal OUT1 during the period when the corresponding pixel driver circuit row is not scanned.

Figure 9:
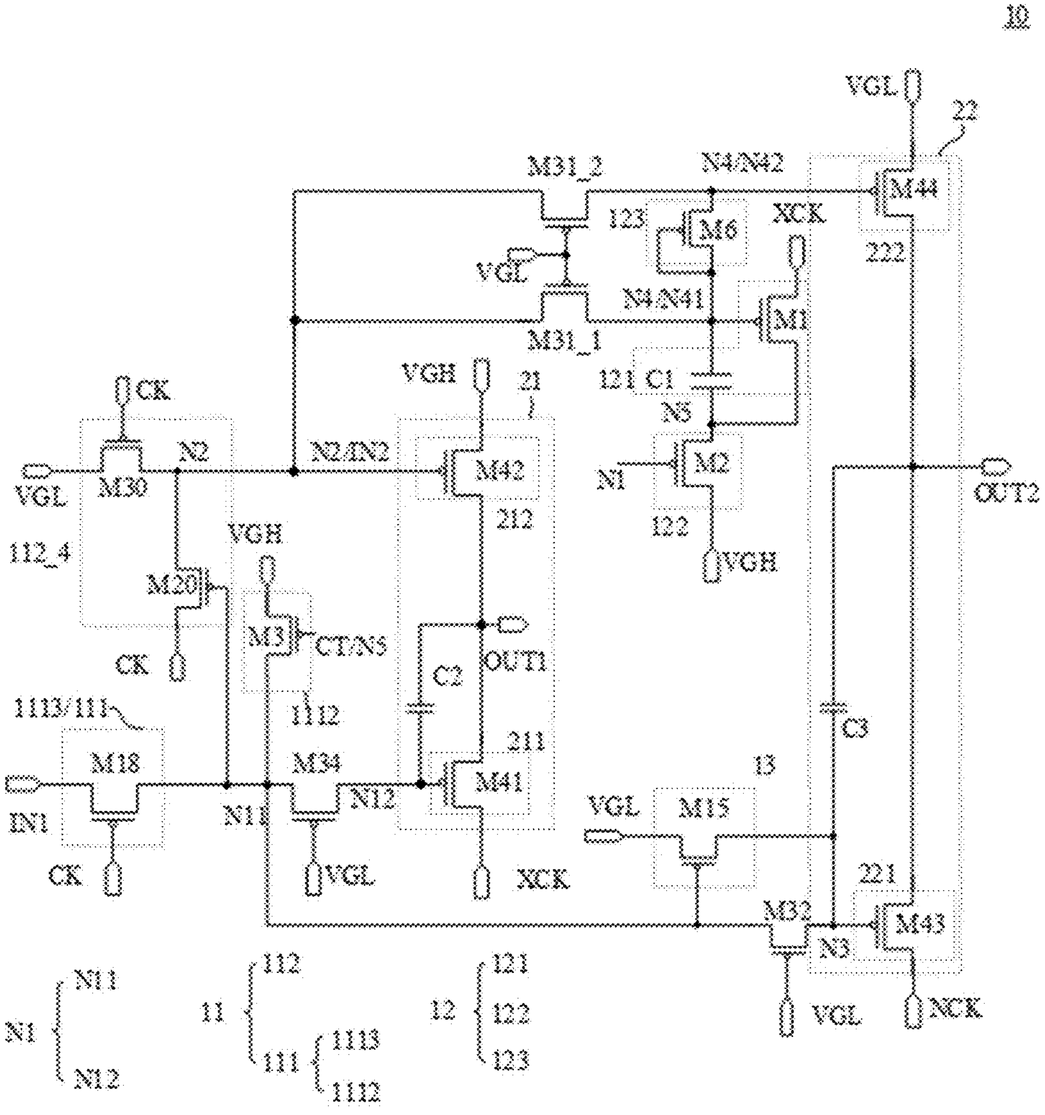
FIG. 9 is another schematic diagram of a gate driver circuit according to some embodiments of the present disclosure.
Figure 10:
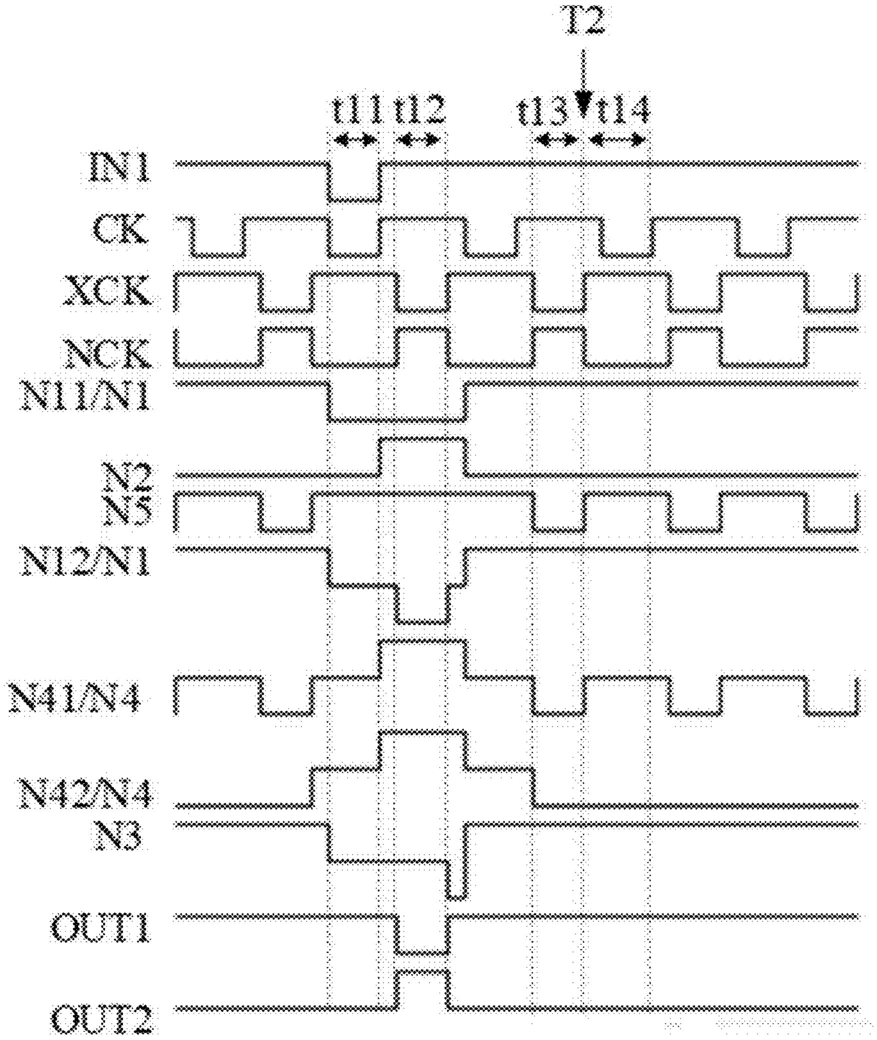
FIG. 10 is a schematic diagram of an operating timing corresponding to FIG. 9.
Figure 11:
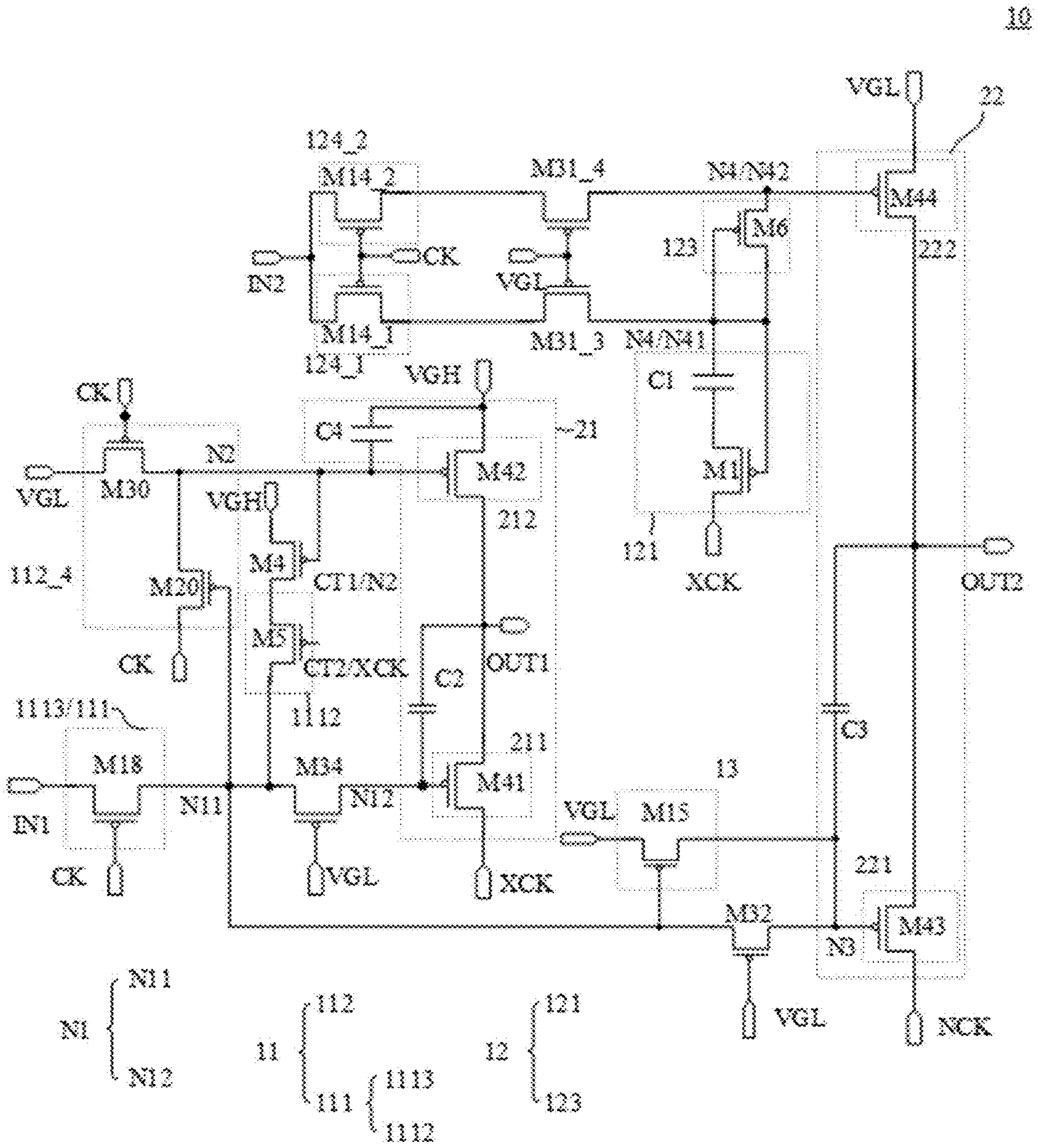
FIG. 11 is another schematic diagram of a gate driver circuit according to some embodiments of the present disclosure.
Figure 12:
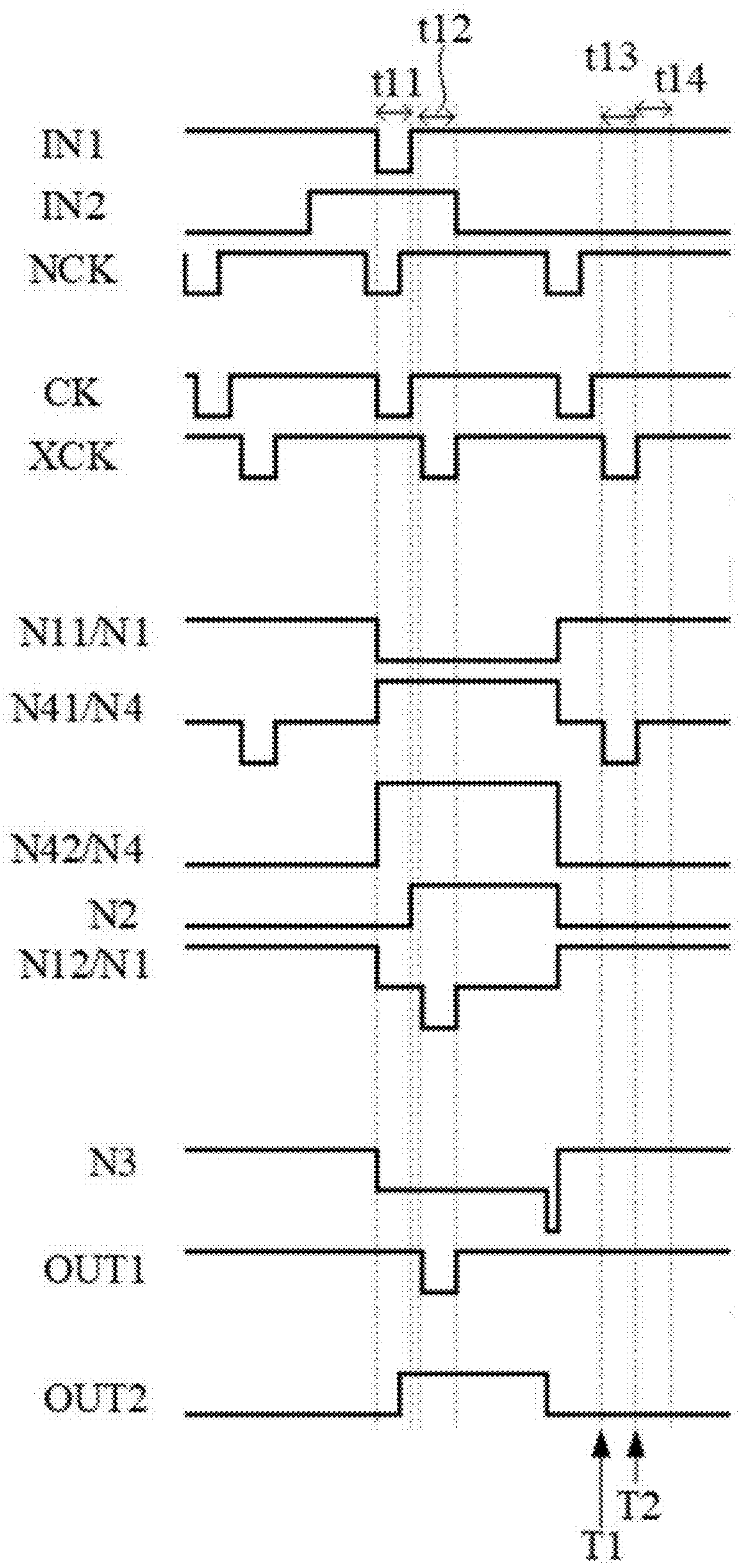
FIG. 12 is a schematic diagram of an operating timing corresponding to FIG. 11.

Exemplarily, reference is made to FIG. 9, FIG. 10, FIG. 11, and FIG. 12, in which FIG. 9 and FIG. 11 are another two schematic diagrams of gate driver circuits according to some embodiments of the present disclosure, FIG. 10 is a schematic diagram of an operating timing corresponding to FIG. 9, and FIG. 12 is a schematic diagram of an operating timing corresponding to FIG. 11. In the embodiments of the present disclosure, the fourth node N4 can include a first sub-node N41 and a second sub-node N42, and the first sub-node N41 is electrically connected to the first adjustment unit 121, that is, the first sub-node signal of the first sub-node N41 can be written as the third level signal by the first adjustment unit 121 during the third periods t13 shown in FIG. 10 and FIG. 12.

As shown in FIG. 9 and FIG. 11, the second sub-node N42 is electrically connected to the fourth output sub-module 222, that is, the fourth output sub-module 222 is electrically connected to the first level signal terminal VGL and the second output terminal OUT2 under control of the second sub-node N42.

As shown in FIG. 9 and FIG. 11, the second driving module 12 includes an isolation unit 123 electrically connected to the first sub-node N41 and the second sub-node N42.

In the embodiments of the present disclosure, the second input signal terminal IN2 is electrically connected to the first sub-node N41 and the second sub-node N42. The first sub-node N41 and the second sub-node N42 can be configured to receive the signal provided by the second input signal terminal IN2.

As shown in FIG. 10 and FIG. 12, during the third period t13, the first adjustment unit 121 can pull down the first sub-node signal of the first sub-node N41 to the third level signal. When the first sub-node N41 transmits the third level signal, the isolation unit 123 is turned on, and the first sub-node N41 is electrically connected to the second sub-node N42, so that the third level signal of the first sub-node N41 can be written to the second sub-node N42.

When the fourth period t14 starts, that is, at a moment T2, the second clock signal terminal XCK jumps from the first level signal to the second level signal; under the action of the first adjustment unit 121, the first sub-node signal of the first sub-node N41 rises from the third level signal to the first level signal, and the isolation unit 123 is turned off, that is, the first sub-node N41 is disconnected from the second sub-node N42, and the second sub-node signal of the second sub-node N42 can maintain the third level signal during the fourth period t14 when the second clock signal terminal XCK transmits the second level signal, so that the fourth output sub-module 222 can be continuously controlled to be stably turned on, and the first level signal provided by the first level signal terminal VGL can be stably output to the second output terminal OUT2.

Optionally, as shown in FIG. 9 and FIG. 11, the isolation unit 123 includes a sixth transistor M6, and the sixth transistor M6 is electrically connected between the first sub-node N41 and the second sub-node N42 and has a gate electrically connected to the first sub-node N41.

Optionally, the sixth transistor M6 includes a P-type transistor.

For example, as shown in FIG. 1, FIG. 7, and FIG. 9, in the embodiments of the present disclosure, the second input signal terminal IN2 can be electrically connected to the second node N2, that is, the fourth node N4 can be electrically connected to the second node N2. Based on such configuration, the second node N2 can be used as a signal source for providing a signal to the fourth node N4 without additionally providing a new signal terminal, which simplifies the structure of the gate driver circuit 10.

In a case where the fourth node N4 includes the first sub-node N41 and the second sub-node N42, exemplarily, as shown in FIG. 9, the fourth node N4 being electrically connected to the second node N2 means that the first sub-node N41 and the second sub-node N42 are both electrically connected to the second node N2.

Figure 13:
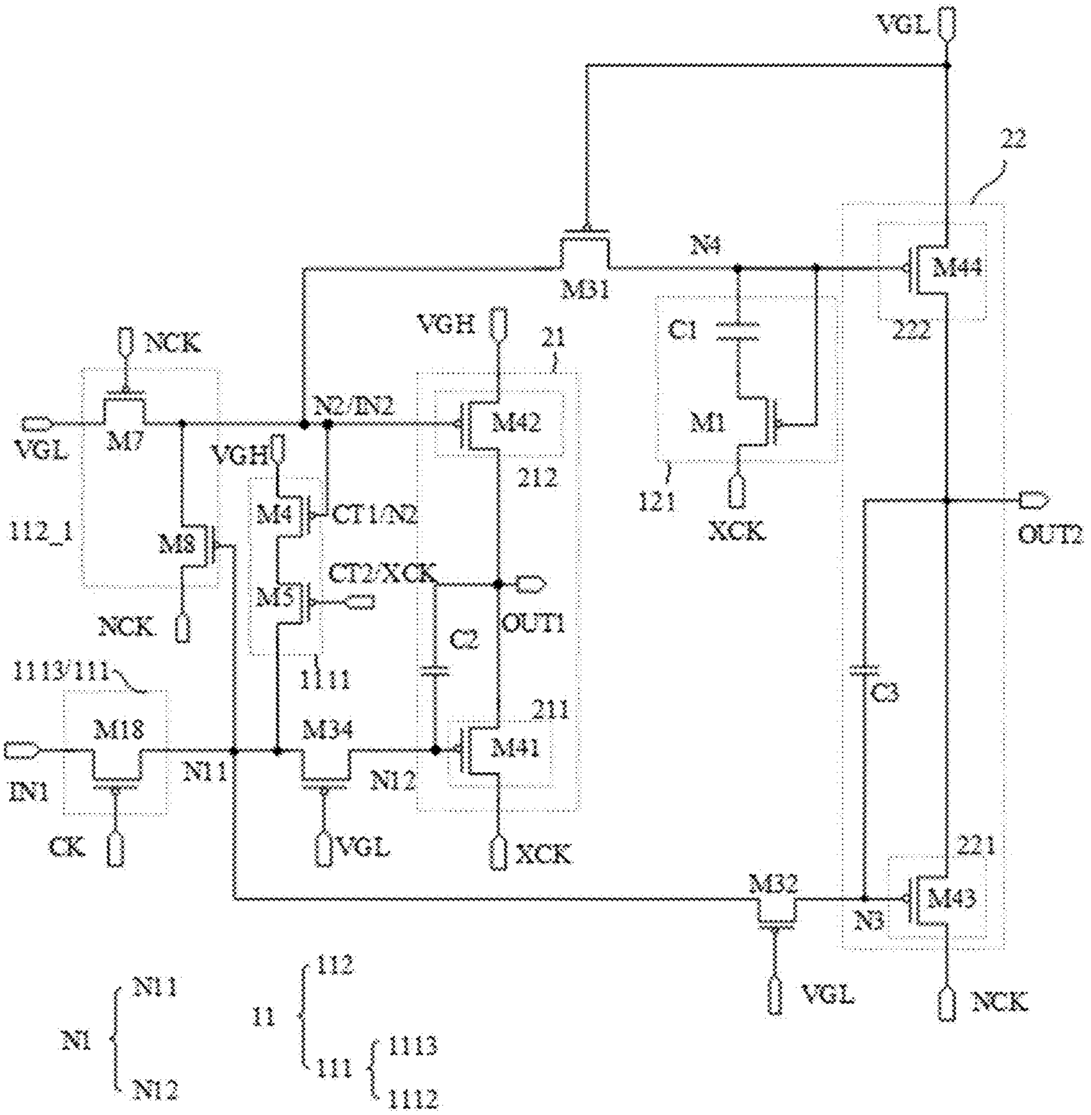
FIG. 13 is another schematic diagram of a gate driver circuit according to some embodiments of the present disclosure.

Exemplarily, as shown in FIG. 1, FIG. 9, and FIG. 13 that is another schematic diagram of a gate driver circuit according to some embodiments of the present disclosure, in the embodiments of the present disclosure, the first node N1 can be electrically connected to the third node N3, and the second node N2 can be electrically connected to the fourth node N4.

When the gate driver circuit 10 operates, during at least part of the first period t11, the first node signal of the first node N1 and the second node signal of the second node N2 each are an enable level; the first node signal being the enable level means that the first node signal can control the first output sub-module 211 and the third output sub-module 221 to be turned on; the second node signal being the enable level means that the second node signal can control the second output sub-module 212 and the fourth output sub-module 222 to be turned on; and when the first output sub-module 211, the second output sub-module 212, the third output sub-module 221, and the fourth output sub-module 222 all include the P-type transistors, and the enable level includes the first level signal.

FIG. 2 and FIG. 10 illustrate that the first node signal of the first node N1 and the second node signal of the second node N2 each are the first level signal during the first period t11.

Figure 14:
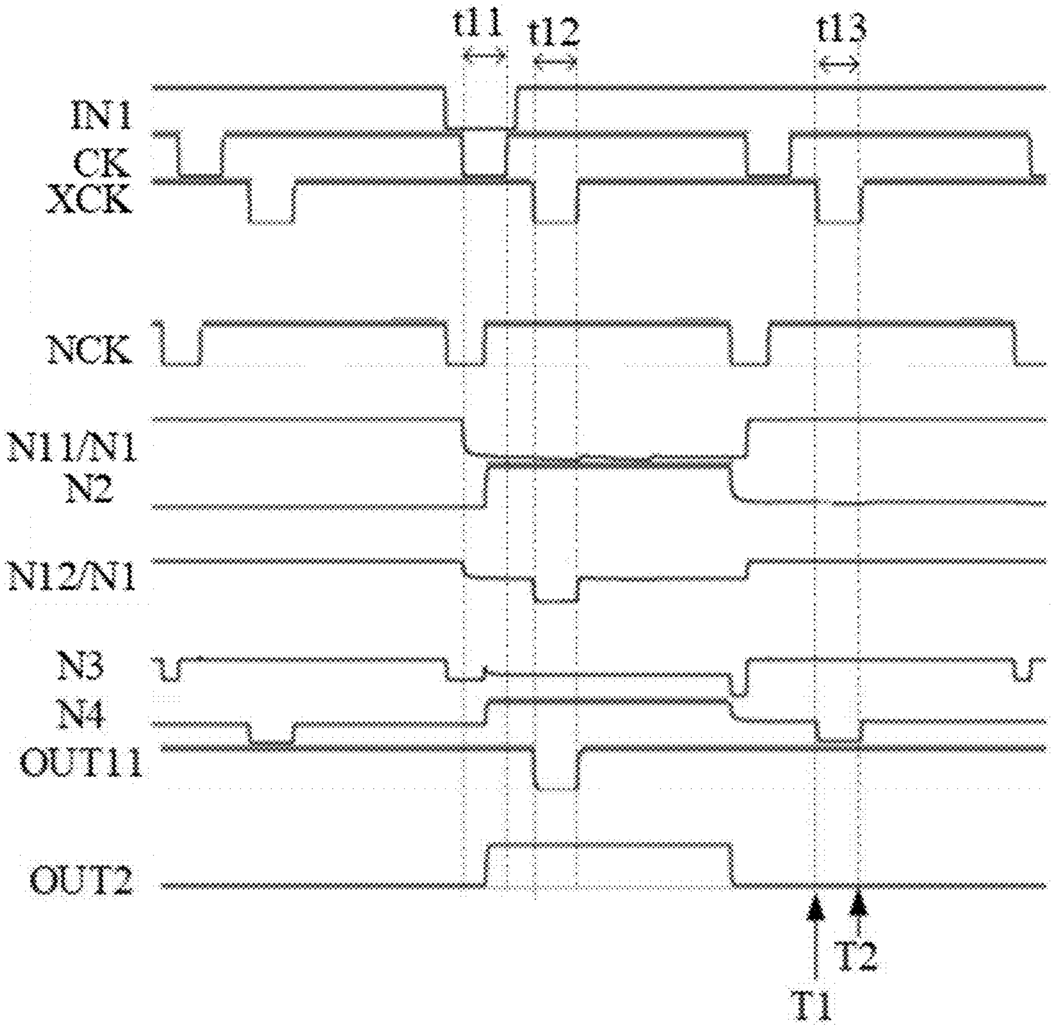
FIG. 14 is a schematic diagram of an operating timing corresponding to FIG. 13.

Alternatively, as shown in FIG. 14 that is a schematic diagram of an operating timing corresponding to FIG. 13, FIG. 14 illustrates that the first node signal of the first node N1 and the second node signal of the second node N2 are the first level signals during part of the first period t11, and correspondingly, the third node signal of the third node N3 and the fourth node signal of the fourth node N4 are also the first level signal during at least part of the first period t11, that is, the third output sub-module 221 and the fourth output sub-module 222 are both turned on during at least part of the first period t11.

As shown in FIG. 2, FIG. 10, and FIG. 14, when the first node signal and the second node signal each are the enable level, in the embodiments of the present disclosure, the signal of the third clock signal terminal NCK can be the same as the first level signal of the first level signal terminal VGL, that is, the signal of the third clock signal terminal NCK can be the first level signal, so that the second output terminal OUT2 stably outputs the first level signal, thereby avoiding the problem of short circuit between the third clock signal terminal NCK and the first level signal terminal VGL.

With the first driving module 11, as shown in FIG. 13, the first driving module 11 includes a second signal writing unit 112, and the second signal writing unit 112 is electrically connected to the first node N1, the third clock signal terminal NCK, and the first level signal terminal VGL, and is electrically connected to the third clock signal terminal NCK and the second node N2 based on the first node signal, and is electrically connected to the first level signal terminal VGL and the second node N2 based on the signal of the third clock signal terminal NCK.

For example, as shown in FIG. 14, in the embodiments of the present disclosure, the first level signal of the third clock signal terminal NCK and the first level signal of the first clock signal terminal CK can at least partially overlap, and the first level signal of the third clock signal terminal NCK and the first level signal of the first input signal terminal IN1 can at least partially overlap. Further, the pulse width of the first level signal of the third clock signal terminal NCK is smaller than or equal to the pulse width of the second level signal.

Optionally, as shown in FIG. 13, the second signal writing unit 112 includes a seventh transistor M7 and an eighth transistor M8. The seventh transistor M7 is electrically connected between the first level signal terminal VGL and the second node N2 and has a gate electrically connected to the third clock signal terminal NCK, and the eighth transistor M8 is electrically connected between the third clock signal terminal NCK and the second node N2 and has a gate electrically connected to the first node N1.

As shown in FIG. 14, during the first period t11, the first node signal of the first node N1 is the first level signal, and the eighth transistor M8 is turned on. In the embodiments of the present disclosure, the third clock signal terminal NCK provides the second level signal during part of the first period t11, so that the second level signal can be written to the second node N2 by the eighth transistor M8, and the second output sub-module 212 can be controlled to be turned off when the first output sub-module 211 is turned on.

Figure 15:
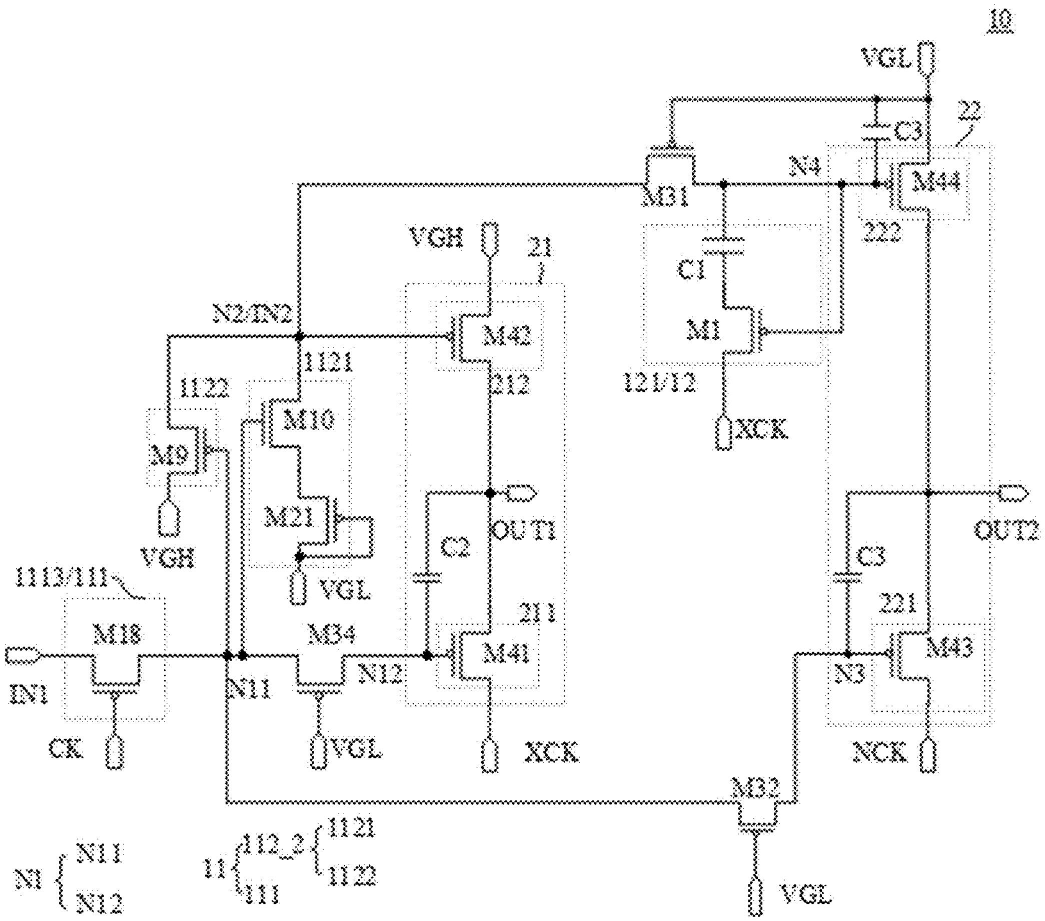
FIG. 15 is another schematic diagram of a gate driver circuit according to some embodiments of the present disclosure.
Figure 16:
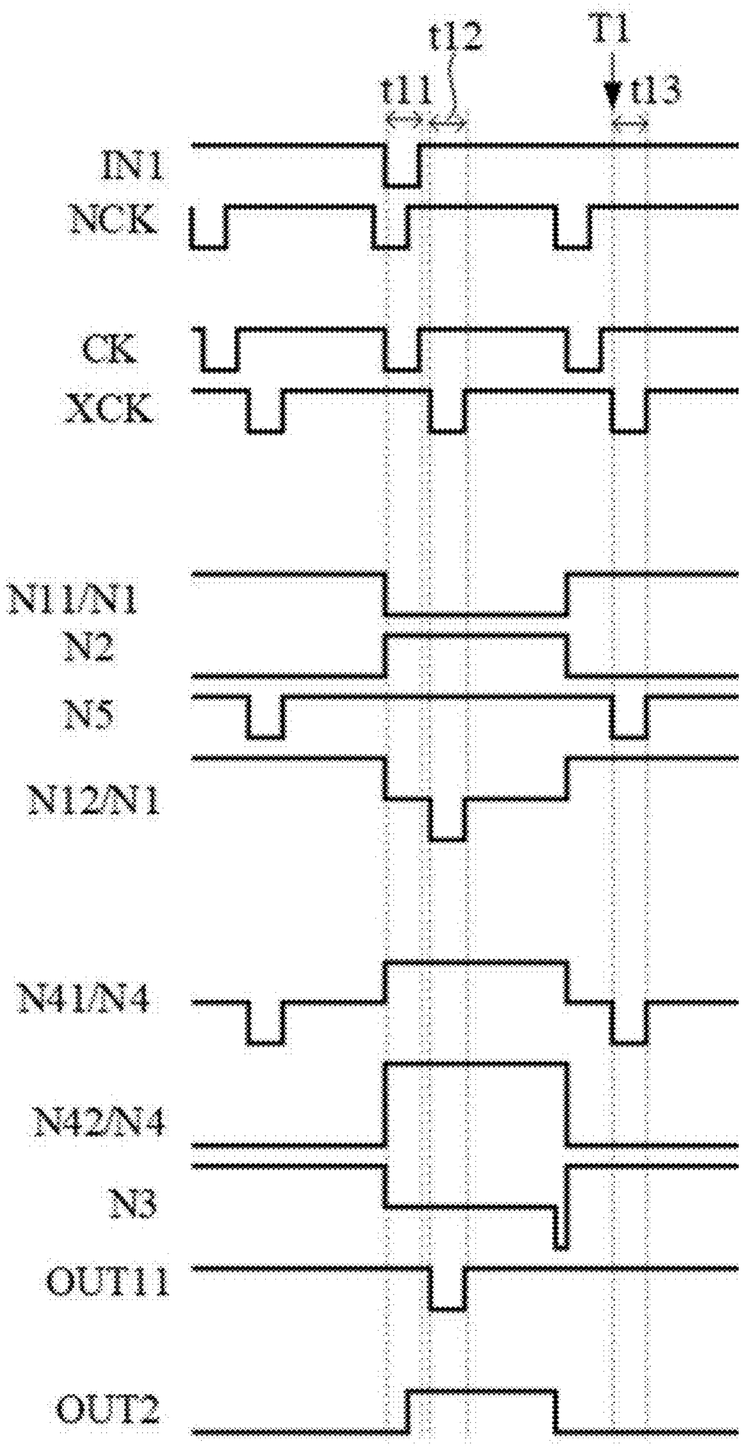
FIG. 16 is a schematic diagram of an operating timing corresponding to FIG. 15.

The example in which the first node N1 and the second node N2 each are at the enable level (for example, the first level signal) during part of the first period t11 is provided above to illustrate the structure of the gate driver circuit 10. In another optional embodiment, as shown in FIG. 15, FIG. 16, FIG. 17, and FIG. 18, FIG. 15 and FIG. 17 are another two schematic diagrams of gate driver circuits according to some embodiments of the present disclosure, FIG. 16 is a schematic diagram of an operating timing corresponding to FIG. 15, and FIG. 18 is a schematic diagram of an operating timing corresponding to FIG. 17. During the first period t11, in the embodiments of the present disclosure, the first level signal of the first node N1 can be an enable level, and the second level signal of the second node N2 can be a disable level. FIG. 16 and FIG. 18 illustrate that the enable level of the first node N1 is the first level signal, and the disable level of the second node N2 is the second level signal.

Figure 17:
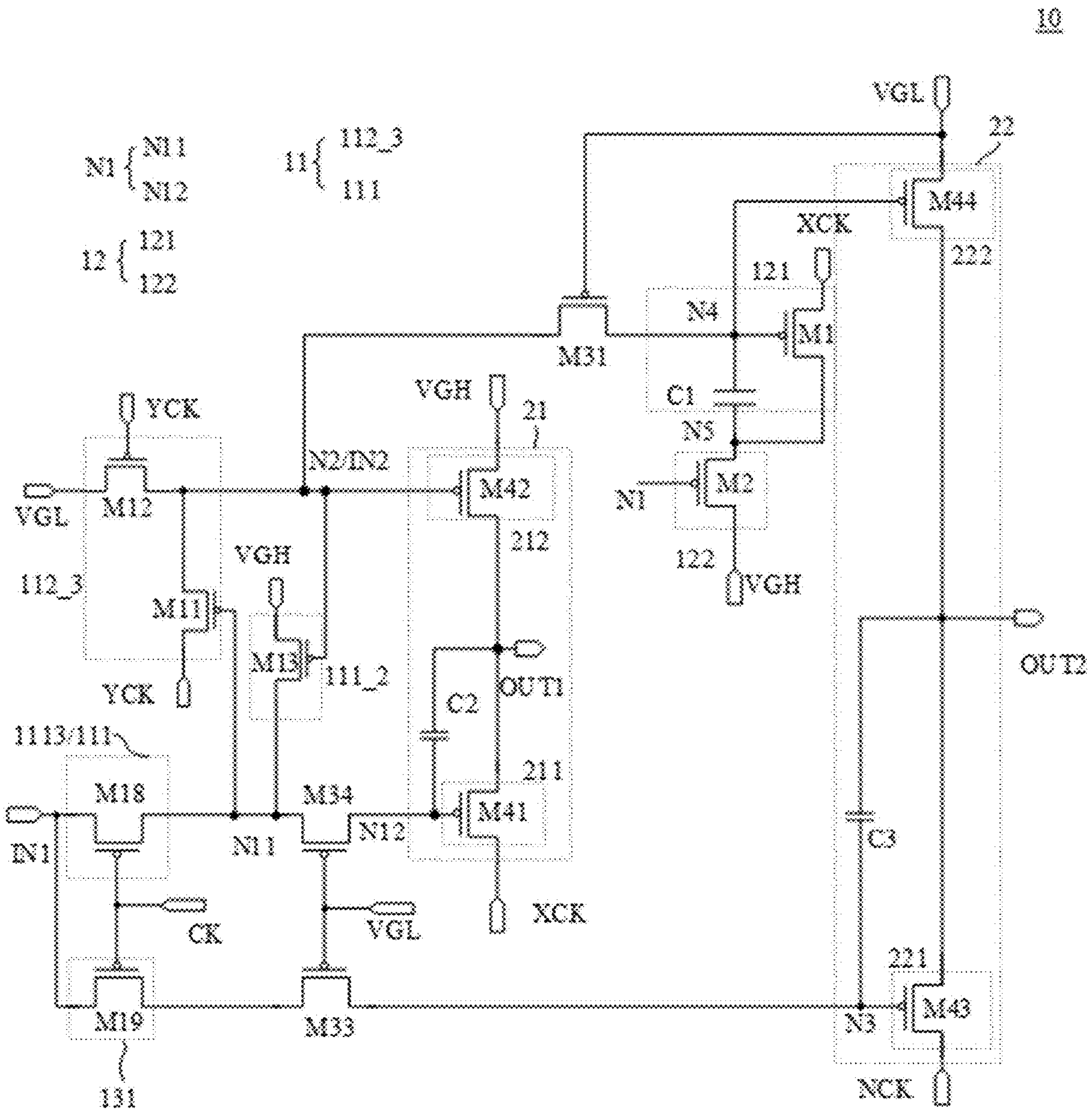
FIG. 17 is another schematic diagram of a gate driver circuit according to some embodiments of the present disclosure.
Figure 18:
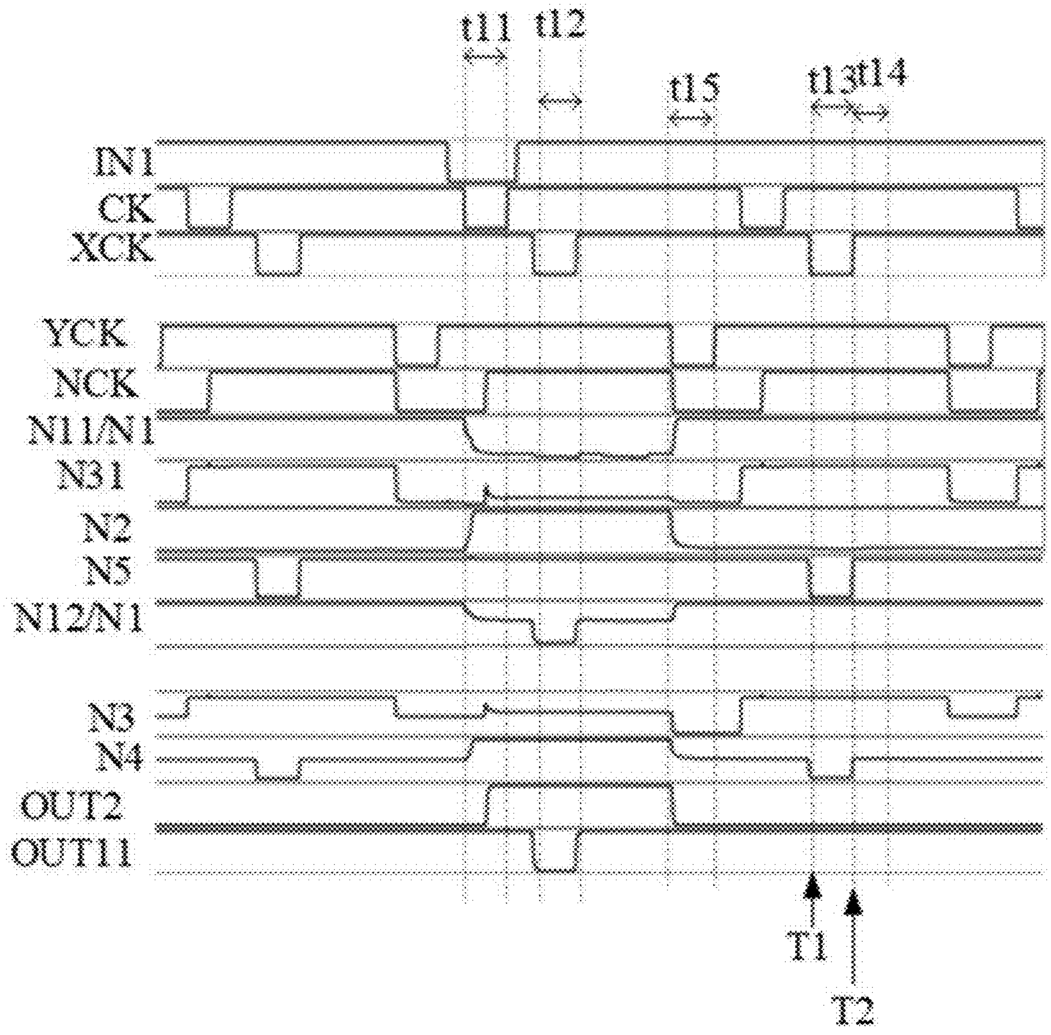
FIG. 18 is a schematic diagram of an operating timing corresponding to FIG. 17.

Exemplarily, as shown in FIG. 15 and FIG. 17, in the embodiments of the present disclosure, the third node N3 can be electrically connected to the first node N1, and the fourth node N4 can be electrically connected to the second node N2, so as to simplify the structure of the gate driver circuit 10. Based on such configuration, as shown in FIG. 16 and FIG. 18, the third node signal of the third node N3 each can be the first level signal (that is, the enable level) during the first period t11 to control the third output sub-module 221 to be turned on, and the fourth node signal of the fourth node N4 can be the second level signal (that is, the disable level) during the first period t11 to control the fourth output sub-module 222 to be turned off. In this case, as shown in FIG. 16 and FIG. 18, even if the signal of the third clock signal terminal NCK connected to the third output sub-module 221 is the second level signal during at least part of the first period t11, that is, even if the signal of the third clock signal terminal NCK and the signal of the first level signal terminal VGL are different from each other during the first period t11, the short circuit of the second output module 22 can be avoided. Therefore, based on such configuration, the difficulty of designing the signal of the third clock signal terminal NCK can be reduced; for example, only during part of the period when the first node signal of the first node N1 is the first level signal (for example, the second period t12), the third clock signal terminal NCK provides the second level signal to meet the logic requirement for the second control signal.

Optionally, during the first period t11, in the embodiments of the present disclosure, the third clock signal terminal NCK can be configured to provide the first level signal or the second level signal, so that the freedom of designing the signal of the third clock signal terminal NCK can be increased while satisfying the operation requirement for the gate driver circuit 10 and avoiding the short circuit of the second output module 22 in the first period t11.

FIG. 16 and FIG. 18 illustrate that the third clock signal terminal NCK first provides the first level signal and then provides the second level signal during the first period t11.

Exemplarily, as shown in FIG. 15, the first driving module 11 includes a second signal writing unit 112 configured to write the second node signal to the second node N2. In order to be distinguished from the second signal writing unit 112 in FIG. 13, the second signal writing unit in FIG. 15 is labeled as 112_2 and the second signal writing unit in FIG. 13 is labeled as 112_1 below.

As shown in FIG. 15, the second signal writing unit 112_2 includes a first signal writing sub-unit 1121 and a second signal writing sub-unit 1122, the first signal writing sub-unit 1121 is electrically connected to the first node N1 and the first level signal terminal VGL and is electrically connected to the first level signal terminal VGL and the second node N2 based on the first node signal of the first node N1 during the first period t11. The second signal writing sub-unit 1122 is electrically connected to the first node N1 and the second level signal terminal VGH, and is electrically connected to the second level signal terminal VGH and the second node N2 based on the first node signal of the first node N1.

Under control of the first node N1, as shown in FIG. 16, the second signal writing sub-unit 1122 in the second signal writing unit 112_2 is turned on during the first period t11, so that the second node N2 transmits the second level signal (that is, the disable level), thereby avoiding that the fourth output sub-module 222 is turned on during the first period t11.

Further, based on such configuration, the first signal writing sub-unit 1121 in the second signal writing unit 112_2 is turned on during the second period t12, and the second node N2 transmits the first level signal, that is, the enable level, so that the fourth output sub-module 222 can be turned on during the second period t12, the first level signal terminal VGL is electrically connected to the second output terminal OUT2, and the second output terminal OUT2 outputs the first level signal.

Exemplarily, still referring to FIG. 15, the second signal writing sub-unit 1122 includes a ninth transistor M9, and the first signal writing sub-unit 1121 includes a tenth transistor M10. The ninth transistor M9 is connected between the second level signal terminal VGH and the second node N2, and has a gate connected to the first node N1. The tenth transistor M10 is electrically connected between the first level signal terminal VGL and the second node N2, and has a gate connected to the first node N1.

When the first node signal of the first node N1 is the enable level (for example, the first level signal) which can control the ninth transistor M9 to be turned on, the ninth transistor M9 is turned on, and the second level signal provided by the second level signal terminal VGH is written to the second node N2 by the ninth transistor M9.

When the first node signal of the first node N1 is the enable level (for example, the second level signal) which can control the tenth transistor M10 to be turned on, the tenth transistor M10 is turned on, and the low level provided by the first level signal terminal VGL is written to the second node N2 by the tenth transistor M10.

Optionally, as shown in FIG. 15, the ninth transistor M9 includes a P-type transistor, and the tenth transistor M10 includes an N-type transistor.

Optionally, as shown in FIG. 15, the second signal writing unit 112_2 includes a first auxiliary transistor M21, and the tenth transistor M10 is electrically connected to the first level signal terminal VGL through the first auxiliary transistor M21. That is, the first auxiliary transistor M21 is electrically connected between the tenth transistor M10 and the first level signal terminal VGL. As shown in FIG. 15, the first auxiliary transistor M21 has a gate connected to the first level signal terminal VGL.

In the embodiments of the present disclosure, with the first auxiliary transistor M21, compared with a method in which a first electrode of the tenth transistor M10 is directly electrically connected to the first level signal terminal VGL, a potential of the first electrode of the tenth transistor M10 can be raised, and under a condition that a voltage value of the first node signal of the first node N1 is negative and its absolute value is smaller than an absolute value of a voltage of the first level signal transmitted by the first input signal terminal IN1 during the first period t11, it can be ensured that a voltage difference between a gate and the first electrode of the tenth transistor M10 is still smaller than a threshold voltage of the tenth transistor M10, that is, a false turning on of the tenth transistor M10 can be prevented during the first period t11, and the high level provided by the second level signal terminal VGH can be prevented from being written to the second node N2 during the first period t11, which is beneficial for ensuring an operation accuracy of the gate driver circuit 10.

Exemplarily, as shown in FIG. 17, some embodiments of the present disclosure provide another design method of the second signal writing unit, and in order to distinguish from the second signal writing units in FIG. 13 and FIG. 15, the second signal writing unit in FIG. 17 is labeled as 112_3 below.

The second signal writing unit 112_3 is electrically connected to the fourth clock signal terminal YCK, the first level signal terminal VGL, the first node N1, and the second node N2, and is configured to output the second node signal to the second node N2 based on a signal of a fourth clock signal terminal YCK and the signal of the first level signal terminal VGL, and is configured to output the second node signal to the second node N2 based on the signal of the first node N1 and the signal of the fourth clock signal terminal YCK.

As shown in FIG. 18, the signal of the fourth clock signal terminal YCK is a pulse signal which can be switched between the first level signal and the second level signal.

Optionally, a cycle of the signal of the fourth clock signal terminal YCK can be the same as a cycle of the signal of the first clock signal terminal CK, and can be the same as a cycle of the signal of the second clock signal terminal XCK. Further, the first level signal of the fourth clock signal terminal YCK is offset from the first level signal of the first clock signal terminal CK and the first level signal of the second clock signal terminal XCK.

When the first node signal of the first node N1 is the enable level (that is, the first level signal), for example, during the first period t11 and the second period t12 in FIG. 18, the signal of the fourth clock signal terminal YCK is the second level signal, so that the second level signal can be stably written to the second node N2 by the second signal writing unit 112_3, thereby preventing the first node N1 and the second node N2 from transmitting the first level signal at the same time.

When the fourth clock signal terminal YCK transmits the first level signal, for example, during a fifth period t15 shown in FIG. 18, the first level signal provided by the first level signal terminal VGL can be written to the second node N2, so that the second output sub-module 212 can be controlled to be turned on to output the second level signal provided by the second level signal terminal VGH to the first output terminal OUT1 through the second output sub-module 212.

Optionally, as shown in FIG. 17, in some embodiments of the present disclosure, the fourth node N4 can be electrically connected to the second node N2 to avoid additionally providing terminals configured to provide signals to the fourth node N4 in the gate driver circuit 10, thereby simplifying the structure of the gate driver circuit 10. In this case, as shown in FIG. 18, the fourth node signal of the fourth node N4 is written to the first level signal during the fifth period t15, so that the fourth output sub-module 222 can be controlled to be turned on to output the signal provided by the first level signal terminal VGL to the second output terminal OUT2 through the fourth output sub-module 222. Further, the difficulty of designing the third clock signal terminal NCK can be reduced. FIG. 18 illustrates that the third clock signal terminal NCK is first the first level signal and then the second level signal during the first period t11.

Optionally, as shown in FIG. 18, during part of the period when the third clock signal terminal NCK transmits the first level signal, the fourth clock signal terminal YCK is also the first level signal, so that the second node signal of the second node N2 is written to the first level signal.

Exemplarily, as shown in FIG. 17, in some embodiments of the present disclosure, the second signal writing unit 112_3 can include an eleventh transistor M11 and a twelfth transistor M12, and the eleventh transistor M11 is electrically connected between the fourth clock signal terminal YCK and the second node N2 and has a gate electrically connected to the first node N1. The twelfth transistor M12 is electrically connected between the first level signal terminal VGL and the second node N2 and has a gate electrically connected to the fourth clock signal terminal YCK.

Optionally, as shown in FIG. 17, the eleventh transistor M11 and the twelfth transistor M12 each include a P-type transistor.

As an example, as shown in FIG. 17, some embodiments of the present disclosure provide another designing method of the first signal writing unit 111. In order to be distinguished from the first signal writing unit 111 in FIG. 1, the first signal writing unit in FIG. 17 is labeled as 111_2 and the first signal writing unit in FIG. 1 is labeled as 111_1 below.

As shown in FIG. 17, the first signal writing unit 111_2 includes a second sub-unit 1112, and the second sub-unit 1112 is configured to receive the second node signal of the second node N2 and is electrically connected to the second level signal terminal VGH and the first node N1. That is, under control of the second node N2, the second sub-unit 1112 is electrically connected to the second level signal terminal VGH and the first node N1 to provide the first node signal to the first node N1.

Based on such configuration, when the second node signal of the second node N2 is the first level signal, that is, during the third period t13 shown in FIG. 18, the second sub-unit 1112 is turned on, so that the second level signal of the second level signal terminal VGH can be written to the first node N1 through the second sub-unit 1112 to control the first output sub-module 211 to be turned off.

As shown in FIG. 17, the second sub-unit 1112 includes a thirteenth transistor M13, and the thirteenth transistor M13 is electrically connected between the second level signal terminal VGH and the first node N1 and has a gate electrically connected to the second node N2.

Optionally, the thirteenth transistor M13 includes a P-type transistor.

The example in which the fourth node N4 is electrically connected to the second node N2 is provided above to illustrate the structure of the gate driver circuit 10. In another optional embodiment, as shown in FIG. 5 and FIG. 11, in addition to the first adjustment unit 121 and the second adjustment unit 122, in the embodiments of the present disclosure, a fourth signal writing unit 124 can be provided in the second driving module 12, and the fourth signal writing unit 124 is electrically connected to the second input signal terminal IN2 and the first clock signal terminal CK and is configured to output the fourth node signal to the fourth node N4 based on the signal of the first clock signal terminal CK and the signal of the second input signal terminal IN2. Specifically, under control of the enable level provided by the first clock signal terminal CK, the fourth signal writing unit 124 is electrically connected to the second input signal terminal IN 2 and the fourth node N4.

As shown FIG. 6 and FIG. 12, in addition to providing the disable level (that is, the level which can control the fourth output sub-module 222 to be turned off, and FIG. 6 and FIG. 12 illustrate that the disable level is the second level signal) during the second period t12, the second input signal terminal IN2 provides a disable level during at least part of the period when the second control signal is the disable level. As shown in FIG. 6 and FIG. 12, the second input signal terminal IN2 is configured to provide a disable level during the first period t11; and FIG. 6 and FIG. 12 illustrates that the disable level is the second level signal.

Exemplarily, as shown in FIG. 5 and FIG. 11, the fourth signal writing unit 124 includes a fourteenth transistor M14. The fourteenth transistor M14 is electrically connected between the second input signal terminal IN2 and the fourth node N4 and has a gate electrically connected to the first clock signal terminal CK.

As shown in FIG. 6 and FIG. 12, during the first period t11, the first clock signal terminal CK provides the first level signal, the fourteenth transistor M14 is turned on, the second level signal provided by the second input signal terminal IN2 is written to the fourth node N4 through the fourteenth transistor M14 to control the fourth output sub-module 222 to be turned off.

During the first period t11, as shown in FIG. 6 and FIG. 12, the first node signal of the first node N1 is the first level signal. Therefore, as shown in FIG. 5 and FIG. 11, in some embodiments of the present disclosure, the third node N3 can be electrically connected to the first node N1, so that the third node signal of the third node N3 is the first level signal to control the third output sub-module 221 to be turned on, and the first level signal first provided by the third clock signal NCK is written to the second output terminal OUT2 by the third output sub-module 221, that is, the second output terminal OUT2 is configured to output the first level signal. Thereafter, the third clock signal terminal NCK is configured to provide the second level signal which can be written to the second output terminal OUT2 by the third output sub-module 221, that is, the second output terminal OUT2 is configured to output the second level signal.

Exemplarily, in the case where the fourth node N4 includes the first sub-node N41 and the second sub-node N42, and in some embodiments of the present disclosure, at least two fourth signal writing units 124 can be provided in the second driving module 12. As shown in FIG. 11, the second driving module 12 includes two fourth signal writing units 124; the expression that the second input signal terminal IN2 is electrically connected to the fourth node N4 through the fourth signal writing unit 124 can mean that the second input signal terminal IN2 is electrically connected to the first sub-node N41 through one of the at least two fourth signal writing units 124, and the second input signal terminal IN2 is electrically connected to the second sub-node N42 through another one of the at least two fourth signal writing units 124.

In order to illustrate the embodiments of the present disclosure more clearly, in FIG. 11, the fourth signal writing unit electrically connected to the first sub-node N41 is labeled as 124_1, and the fourth signal writing unit electrically connected to the second sub-node N42 is labeled as 124_2; and, the fourteenth transistor electrically connected to the first sub-node N41 is labeled as M14_1, and the fourteenth transistor electrically connected to the second sub-node N42 is labeled as M14_2.

As shown in FIG. 6 and FIG. 12, when the first clock signal terminal CK provides the first level signal, for example, at least during the first period t11, the second level signal provided by the second input signal terminal IN2 is written to the first sub-node N41 via the fourteenth transistor M14_1 and is written to the second sub-node N42 via the fourteenth transistor M14_2.

It should be noted that, the structure of the first driving module 11 in each of FIG. 5 and FIG. 11 is presented only as an example; in the embodiments of the present disclosure, the first driving module 11 in each of FIG. 5 and FIG. 11 can be designed in the manner shown in FIG. 15 or FIG. 17, which is not repeated herein.

Optionally, as shown in FIG. 1, FIG. 5, FIG. 7, FIG. 9, FIG. 11, FIG. 13, FIG. 15, and FIG. 17, the second driving module 12 includes a first protection transistor M31, and the first protection transistor M31 is electrically connected between the second input signal terminal IN2 and the fourth node N4 and has a gate electrically connected to the first level signal terminal VGL.

When the fourth node signal of the fourth node N4 is coupled to the third level signal due to the providing of the first adjustment unit 121, the first protection transistor M31 is turned off, so that the second input signal terminal IN2 can be disconnected from the fourth node N4, and it can be avoided that the third level signal of the fourth node N4 reduces the reliability of the transistor connected to the second input signal terminal IN2.

For example, when the second input signal terminal IN2 is electrically connected to the second node N2, as shown in FIG. 1, FIG. 7, FIG. 9, FIG. 13, FIG. 15, and FIG. 17, the first protection transistor M31 is electrically connected between the second node N2 and the fourth node N4. When the potential of the fourth node N4 is changed to the third level signal under the action of the first adjustment unit 121, the first protection transistor M31 is turned off, so that the second node N2 can be still at the first level signal, thereby increasing the reliability of the transistor electrically connected to the second node N2.

Optionally, when the second input signal terminal IN2 is electrically connected to the fourth node N4 via the fourth signal writing unit 124, as shown in FIG. 5 and FIG. 11, the first protection transistor M31 is electrically connected between the fourth signal writing unit 124 and the fourth node N4. When the fourth node signal of the fourth node N4 is changed to the third level signal, the potential of one electrode of the fourth signal writing unit 124 electrically connected to the first protection transistor M31 can be still at the first level signal, thereby increasing the reliability of the transistor in the fourth signal writing unit 124.

It should be noted that, when the fourth node N4 includes the first sub-node N41 and the second sub-node N42, the number of the first protection transistors M31 can correspondingly be two. As shown in FIG. 9 and FIG. 11, one of the two first protection transistors M31 is electrically connected to the first sub-node N41, and the other one of the two first protection transistors M31 is electrically connected to the second sub-node N42.

In order to illustrate the embodiments of the present disclosure more clearly, in FIG. 9, the first protection transistor connected between the second node N2 and the first sub-node N41 is labeled as M31_1, and the first protection transistor connected between the second node N2 and the second sub-node N42 is labeled as M31_2.

In FIG. 11, the first protection transistor connected between the fourth signal writing unit 124 and the first sub-node N41 is labeled as M31_3, and the first protection transistor connected between the fourth signal writing unit 124 and the second sub-node N42 is labeled as M31_4.

Optionally, as shown in FIG. 1, FIG. 5, FIG. 7, FIG. 9, and FIG. 11, some embodiments of the present disclosure provide another design of the second signal writing unit 112. In order to be distinguished from the second signal writing unit in FIG. 13, FIG. 15, and FIG. 17, the second signal writing unit in each of FIG. 1, FIG. 5, FIG. 7, FIG. 9, and FIG. 11 is labeled as 112_4 below.

As shown in FIG. 1, FIG. 5, FIG. 7, FIG. 9, and FIG. 11, the second signal writing unit 112_4 is electrically connected to the first clock signal terminal CK, the first level signal terminal VGL, the first node N1, and the second node N2 and is configured to output the second node signal to the second node N2 based on the signal of the first clock signal terminal CK and the signal of the first level signal terminal VGL, and is configured to output the second node signal to the second node N2 based on the first node signal of the first node N1 and the signal of the first clock signal terminal CK.

Exemplarily, as shown in FIG. 1, FIG. 5, FIG. 7, FIG. 9, and FIG. 11, in some embodiments of the present disclosure, the second signal writing unit 112_4 can include a twentieth transistor M20 and a twenty-first transistor M30, and the twentieth transistor M20 is electrically connected between the first clock signal terminal CK and the second node N2 and has a gate electrically connected to the first node N1. The twenty-first transistor M30 is electrically connected between the first level signal terminal VGL and the second node N2 and has a gate electrically connected to the first clock signal terminal CK.

Optionally, as shown in FIG. 1, FIG. 5, FIG. 7, FIG. 9, and FIG. 11, the twentieth transistor M20 and the twenty-first transistor M30 each include a P-type transistor.

Exemplarily, as shown in FIG. 1, FIG. 5, FIG. 7, FIG. 9, FIG. 11, FIG. 13, FIG. 15, and FIG. 17, the first output sub-module 211 includes a first output transistor M41, and the first output transistor M41 is electrically connected between the second clock signal terminal XCK and the first output terminal OUT1 and has a gate electrically connected to the first node N1.

The second output sub-module 212 includes a second output transistor M42, and the second output transistor M42 is electrically connected between the second level signal terminal VGH and the first output terminal OUT1 and has a gate electrically connected to the second node N2.

Optionally, the first output transistor M41 and the second output transistor M42 each include a P-type transistor. When the first node signal of the first node N1 is the first level signal, the first output transistor M41 is turned on, and the signal provided by the second clock signal terminal XCK is output to the first output terminal OUT1. When the second node signal of the second node N2 is the first level signal, the second output transistor M42 is turned on, and the second level signal provided by the second level signal terminal VGH is output to the first output terminal OUT1.

Exemplarily, as shown in FIG. 1, FIG. 5, FIG. 7, FIG. 9, FIG. 11, FIG. 13, FIG. 15, and FIG. 17, the first output module 21 includes a second capacitor C2 electrically connected between the first node N1 and the first output terminal OUT1. The second capacitor C2 can stabilize the first node signal of the first node N1.

Further, as shown in FIG. 2, during the second period t12, when the second clock signal terminal XCK jumps from the second level signal to the first level signal so that the signal of the first output terminal OUT1 jumps from the second level signal to the first level signal, the second capacitor C2 can couple the first node signal of the first node N1 to a potential lower than the first level signal, so that the first output transistor M41 can be turned on more thoroughly, thereby avoiding the trailing phenomenon of the output signal of the first output terminal OUT1.

Exemplarily, as shown in FIG. 1, FIG. 5, FIG. 7, FIG. 9, FIG. 11, FIG. 13, FIG. 15, and FIG. 17, the third output sub-module 221 includes a third output transistor M43, and the third output transistor M43 is electrically connected between the third clock signal terminal NCK and the second output terminal OUT2 and has a gate electrically connected to the third node N3. The fourth output sub-module 222 includes a fourth output transistor M44, and the fourth output transistor M44 is electrically connected between the first level signal terminal VGL and the second output terminal OUT2 and has a gate electrically connected to the fourth node N4.

Optionally, the third output transistor M43 and the fourth output transistor M44 each include a P-type transistor. When the third node signal of the third node N3 is the first level signal, the third output transistor M43 is turned on, and the signal provided by the third clock signal terminal NCK is output to the second output terminal OUT1. When the fourth node signal of the fourth node N4 is the first level signal, the fourth output transistor M44 is turned on, and the first level signal provided by the first level signal terminal VGL is output to the second output terminal OUT2.

Exemplarily, as shown in FIG. 1, FIG. 5, FIG. 7, FIG. 9, FIG. 11, FIG. 13, FIG. 15, and FIG. 17, the second output module 22 includes a third capacitor C3, and the third capacitor C3 is electrically connected between the third node N3 and the second output terminal OUT2. The third capacitor C3 can stabilize the third node signal of the third node N3.

Further, as shown in FIG. 2, after the second period t12 ends, when the third clock signal terminal NCK jumps from the second level signal to the first level signal so that the signal of the second output terminal OUT2 jumps from the second level signal to the first level signal, the third capacitor C3 can be configured to couple the third node signal of the third node N3 to a potential lower than the first level signal, so that the third output transistor M43 can be turned on more thoroughly, thereby avoiding the trailing phenomenon of the output signal of the second output terminal OUT2.

Optionally, as shown in FIG. 11, the first output module 21 includes a fourth capacitor C4, and the fourth capacitor C4 is electrically connected to the second node N2 and the second level signal terminal VGH. With the fourth capacitor C4, the stability of the second node signal of the second node N2.

Optionally, as shown in FIG. 1, FIG. 5, FIG. 7, FIG. 9, FIG. 11, FIG. 13, and FIG. 15, in some embodiments of the present disclosure, the third node N3 can be electrically connected to the first node N1.

In the embodiments of the present disclosure, as shown in FIG. 2, the first node signal of the first node N1 is the first level signal at least during the second period t12, that is, the enable level. Therefore, in the embodiments of the present disclosure, the third node N3 is electrically connected to the first node N1, so that the first level signal is written to the third node signal of the third node N3 during the second period t12, that is, the enable level. In this way, the transistor connected to the third clock signal terminal NCK in the third output sub-module 221 can be controlled to be turned on during the second period t12, the second level signal provided by the third clock signal terminal NCK during the second period t12 can be output to the second output terminal OUT2, so that the enable level of the first control signal and the enable level of the second control signal overlap, which satisfies the timing requirements for the gate driver circuit 10 without a new signal terminal configured to provide a signal to the third node N3, and simplifies the structure of the gate driver circuit 10.

It should be noted that, when the third node N3 is electrically connected to the first node N1, the second input signal terminal IN2 can be electrically connected to the second node N2, which is shown in FIG. 1, FIG. 7, FIG. 9, and FIG. 13. Alternatively, the fourth signal writing unit 124 can be provided in the second driving module 12, so that the second input signal terminal IN2 can be electrically connected to the fourth node N4 via the fourth signal writing unit 124, which is shown in FIG. 5 and FIG. 11.

Exemplarily, as shown in FIG. 1, FIG. 5, FIG. 7, FIG. 9, FIG. 11, FIG. 13, and FIG. 15, the gate driver circuit 10 includes a second protection transistor M32, and the second protection transistor M32 is electrically connected between the first node N1 and the third node N3 and has a gate electrically connected to the first level signal terminal VGL.

In the embodiments of the present disclosure, the third output sub-module 221 includes the third output transistor M43 and the third capacitor C3, and the third output transistor M43 is electrically connected to the third clock signal terminal NCK. When the signal of the third clock signal terminal NCK jumps from the second level signal to the first level signal, as shown in FIG. 2 and FIG. 6, at an end moment T3 of the second period t12, under the action of the third capacitor C3, the third node signal of the third node N3 can be coupled to the third level signal lower than the first level signal. In the embodiments of the present disclosure, with the second protection transistor M32, the second protection transistor M32 is turned off when the third node signal of the third node N3 is the second level signal, so that the first node N1 can be prevented from being affected, and the third node signal of the third node N3 can maintain the third level signal.

Optionally, as shown in FIG. 5, FIG. 7, FIG. 9, and FIG. 11, the gate driver circuit 10 includes a third driving module 13, and the third driving module 13 is electrically connected to the first level signal terminal VGL and is configured to output the third node signal of the third node N3 based on the first node signal of the first node N1 and the signal of the first level signal terminal VGL. In other words, under control of the first node signal of the first node N1, the third driving module 13 can be electrically connected to the first level signal terminal VGL and the third node N3.

In some embodiments of the present disclosure, when the third clock signal terminal NCK jumps from the first level signal to the second level signal, the first node N1 is in a floating state, so that the first node signal maintains the first level signal during the first period t11. The floating state means that the first node N1 does not have a stable signal writing path. Without the third driving module 13, that is, when the third node N3 is electrically connected only to the first node N1, the signal jump of the third clock signal terminal NCK will raise the potential of the third node signal of the third node N3 through the third capacitor C3, thereby affecting the turn-on characteristics of the transistor in the third output sub-module 221. In the embodiments of the present disclosure, with the third driving module 13, when the potential of the third clock signal terminal NCK jumps from the first level signal to the second level signal, the third driving module 13 is turned on under control of the first node N1, so that the first level signal can be stably written to the third node N3 by the first level signal terminal VGL, and it can be avoided that the third node N3 is in the floating state when the potential of the third clock signal terminal NCK jumps from the first level signal to the second level signal. In this way, the third node signal of the third node N3 can be prevented from being affected by the jumping of the signal of the third clock signal terminal NCK, which can improve the stability of the first level signal of the third node N3, and ensure that the third output sub-module 221 can be stably turned on during the second period t12.

Exemplarily, as shown in FIG. 5, FIG. 7, FIG. 9, and FIG. 11, the third driving module 13 includes a fifteenth transistor M15, and the fifteenth transistor M15 is electrically connected between the first level signal terminal VGL and the third node N3 and has a gate electrically connected to the first node N1.

Optionally, the fifteenth transistor M15 includes a P-type transistor. When the first node signal of the first node N1 is the first level signal, the fifteenth transistor M15 is turned on, and the first level signal provided by the first level signal terminal VGL is written to the third node N3, When the signal of the third clock signal terminal NCK jumps high, the third node signal of the third node N3 can be prevented from being coupled to a high potential, so that it can be ensured that the third output sub-module is stably turned on.

Figure 19:
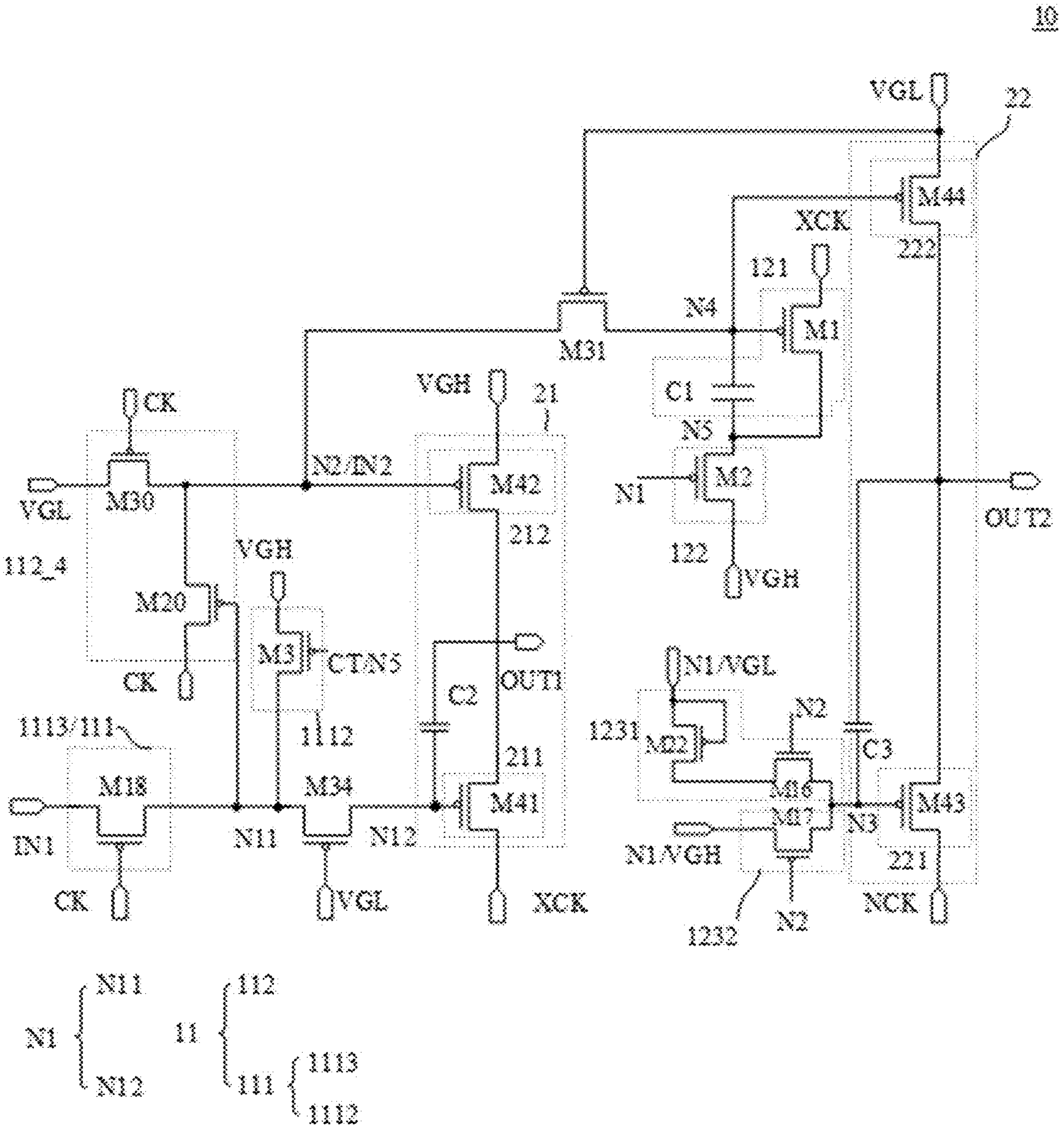
FIG. 19 is another schematic diagram of a gate driver circuit according to some embodiments of the present disclosure.

Alternatively, as shown in FIG. 19 that is another schematic diagram of a gate driver circuit according to some embodiments of the present disclosure, the gate driver circuit 10 includes a third sub-unit 1231 and the fourth sub-unit 1232. The third sub-unit 1231 is electrically connected to the first level signal terminal VGL, the second node N2, and the third node N3 and is configured to output the third node signal of the third node N3 based on the second node signal of the second node N2 and the first level signal of the first level signal terminal VGL. The fourth sub-unit 1232 is electrically connected to the second level signal terminal VGH, the second node N2, and the third node N3, and is configured to output the third node signal of the third node N3 based on the second node signal of the second node N2 and the second level signal of the second level signal terminal VGH.

In some embodiments of the present disclosure, the third sub-unit 1231 and the fourth sub-unit 1232 are turned on in a time-division manner.

Figure 20:
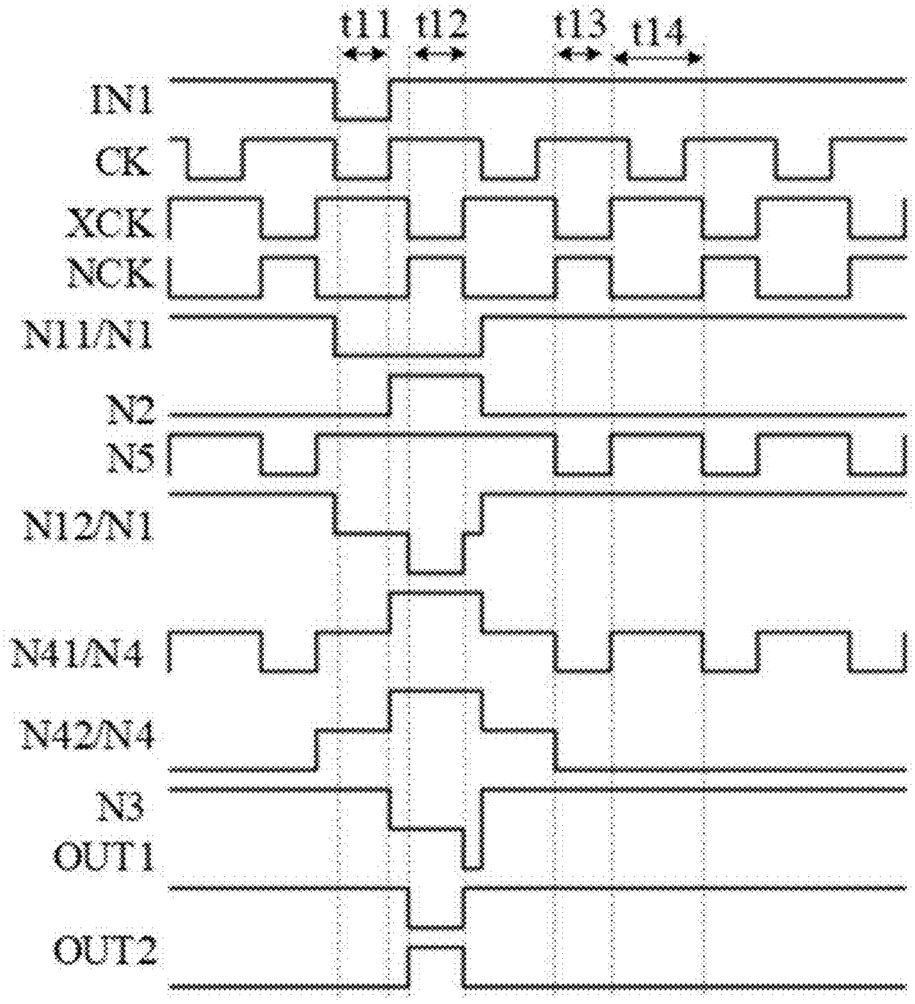
FIG. 20 is a schematic diagram of an operating timing corresponding to FIG. 19.

As shown in FIG. 20 that is a schematic diagram of an operating timing corresponding to FIG. 19, the third sub-unit 1231 is turned on at least during the second period t12, so that the first level signal provided by the first level signal terminal VGL is written to the third node N3, and the third node signal of the third node N3 is the first level signal (that is, the enable level) at least during the second period t12 to control the third output sub-module 221 to be turned on during the second period t12 to write the signal provided by the third clock signal terminal NCK to the second output terminal OUT2.

The fourth sub-unit 1232 is turned on at least during the third period t13, so that the second level signal provided by the second level signal terminal VGH is written to the third node N3 during the third period t13, and the third node signal of the third node N3 is the second level signal (that is, the disable level) at least during the third period t13 to control the third output sub-module 221 to be turned off during both the third period t13 and the fourth period t14 to prevent the signal provided by the third clock signal terminal NCK from being written to the second output terminal OUT2.

Alternatively, as shown in FIG. 19, in some embodiments of the present disclosure, the third sub-unit 1231 can include a sixteenth transistor M16, and the sixteenth transistor M16 is electrically connected between the first level signal terminal VGL and the third node N3 and has a gate electrically connected to the second node N2.

During the second period t12, the sixteenth transistor M16 is turned on.

As shown in FIG. 19, the sixteenth transistor M16 includes an N-type transistor.

In some embodiments of the present disclosure, as shown in FIG. 20, the second node signal of the second node N2 is the second level signal at least during the second period t12. Therefore, at least during the second period t12, the sixteenth transistor M16 is turned on, and thus the third node N3 can be written to a low level by the first level signal provided by the first level signal terminal VGL or the first node N1 during the second period t12, so that the output transistor connected to the third clock signal terminal NCK in the second output module 22 can be controlled to be turned on during the second period t12 to output the second level signal provided by the third clock signal terminal NCK to the second output terminal OUT2. Based on such configuration, there is no need to additionally provide a signal terminal configured to provide a signal to the third node N3, which simplifies the structure of the gate driver circuit 10.

Optionally, as shown in FIG. 19, in some embodiments of the present disclosure, the fourth sub-unit 1232 can include a seventeenth transistor M17, and the seventeenth transistor M17 is electrically connected between the second level signal terminal VGH and the third node N3 and has a gate electrically connected to the second node N2.

Exemplarily, as shown in FIG. 19, the seventeenth transistor M17 includes a P-type transistor. When the second node signal of the second node N2 is the first level signal, that is, at least during the third period t13, the seventeenth transistor M17 is turned on, and the second level signal provided by the second level signal terminal VGH can be written to the third node N3 by the seventeenth transistor M17, so that the third node signal of the third node N3 can be the second level signal to control the transistor in the third output sub-module 221 to be turned off, thereby avoiding false output of the second output terminal OUT2 when the third clock signal terminal NCK provides the second level signal.

Alternatively, as shown in FIG. 19, in some embodiments of the present disclosure, the third sub-unit 1231 is electrically connected between the first node N1 and the third node N3, and the fourth sub-unit 1232 is electrically connected between the first node N1 and the third node N3.

During the second period t12, as shown in FIG. 20, the first node signal of the first node N1 is the first level signal. Therefore, in the embodiments of the present disclosure, the third sub-unit 1231 is electrically connected between the first node N1 and the third node N3, and the second node signal of the second node N2 is the second level signal during the second period t12 to control the third sub-unit 1231 to be turned on. In this case, the first node signal of the first node N1 is the first level signal, and the first level signal can be written to the third node N3 by the third sub-unit 1231, so that the first level signal (that is, the enable level) is written to the third node signal of the third node N3 to control the third output sub-module 221 to be turned on.

During the third period t13, the first node signal of the first node N1 is the second level signal. Therefore, in some embodiments of the present disclosure, the fourth sub-unit 1232 is electrically connected between the first node N1 and the third node N3; during the third period t13, the second node signal of the second node N2 is the first level signal to control the fourth sub-unit 1232 to be turned on, and in this case, the first node signal of the first node N1 is the second level signal, and the second level signal can be written to the third node N3 by the fourth sub-unit 1232, so that the second level signal (that is, the disable level) is written to the third node signal of the third node N3 to control the third output sub-module 221 to be turned off.

Exemplarily, as shown in FIG. 19, the third sub-unit 1231 includes a second auxiliary transistor M22, and the sixteenth transistor M16 is electrically connected to the first level signal terminal VGL or the first node N1 via the second auxiliary transistor M22. That is, the second auxiliary transistor M22 is electrically connected between the first level signal terminal VGL and the sixteenth transistor M16 or between the first node N1 and the sixteenth transistor M16, and has a gate electrically connected to the first level signal terminal VGL or the first node N1.

In the embodiments of the present disclosure, with the second auxiliary transistor M22, the potential of one electrode of the sixteenth transistor M16 electrically connected to the first node N1 or the first level signal terminal VGL can be raised, so that the situation that the sixteenth transistor M16 is wrongly turned on because the second node signal of the second node N2 is not high enough during the third period t13 can be avoided, and thus the situation that a false writing of the first level signal provided by the first level signal terminal VGL or the first node N1 during the second period t12 is wrongly written to the third node N3 can be avoided during the third period t13 and the fourth period t14, which is beneficial for ensuring the operation accuracy of the gate driver circuit 10.

Optionally, as shown in FIG. 1, FIG. 5, FIG. 7, FIG. 11, FIG. 13, FIG. 15, FIG. 17, and FIG. 19, the first driving module 11 includes a first signal writing unit 111, the first signal writing unit 111 includes a fifth sub-unit 1113, and the fifth sub-unit 1113 is electrically connected to the first input signal terminal IN1, the first clock signal terminal CK, and the first node N1 and is configured to output the first node signal to the first node N1 based on the signal of the first clock signal terminal CK and the signal of the first input signal terminal IN1.

Figure 21:
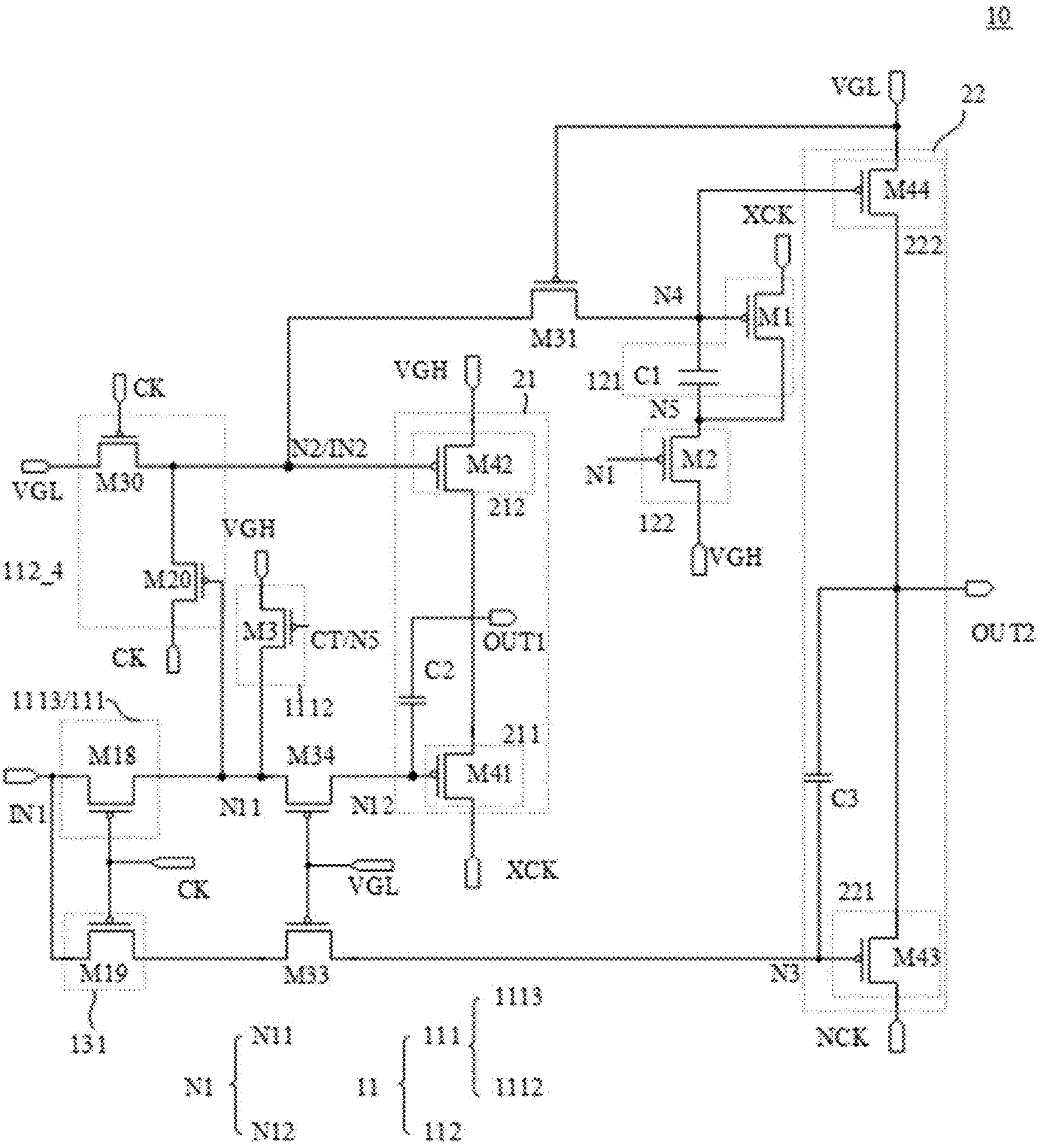
FIG. 21 is another schematic diagram of a gate driver circuit according to some embodiments of the present disclosure.

Exemplarily, as shown in FIG. 17 and FIG. 21 that is another schematic diagram of a gate driver circuit according to some embodiments of the present disclosure, the gate driver circuit 10 includes a third signal writing unit 131, and the third signal writing unit 131 is configured to set the third node signal of the third node N3 to be the enable level, for example, the first level signal, at least during the second period t12.

The third signal writing unit 131 is electrically connected to the first clock signal terminal CK, the first input signal terminal IN1, and the third node N3, and is configured to output the third node signal to the third node N3 based on the signal of the first clock signal terminal CK and the signal of the first input signal terminal IN1.

As shown in FIG. 2, at the moment T3, the signal of the third clock signal terminal NCK jumps from the second level signal to the first level signal, and the jumping of the signal of the third clock signal terminal NCK is coupled to the third node N3 via the third capacitor C3, causing the signal of the third node N3 to jump to a signal lower than the first level signal.

As shown in FIG. 2, during the first period t11, the signal of the first clock signal terminal CK is the first level signal to control the third signal writing unit 131 to be turned on, and the first level signal provided by the first input signal terminal IN1 can be written to the third node N3 through the third driving module 13, so that the third node signal of the third node N3 is the first level signal, and charges the third capacitor C3. During the first period t11, the third output sub-module 221 is turned on, and the first level signal provided by the third clock signal terminal NCK is output to the second output terminal OUT2 through the third output sub-module 221.

During the second period t12, the signal of the first clock signal terminal CK is the second level signal to control the third signal writing unit 131 to be turned off, and the third node signal of the third node N3 can maintain the first level signal during the first period t11 under the action of the third capacitor C3 to control the third output sub-module 221 to continue to be turned on, and the second level signal provided by the third clock signal terminal NCK is output to the second output terminal OUT2 through the third output sub-module 221.

During the third period t13, the signal of the first clock signal terminal CK is the first level signal (that is, the enable level), and controls the third signal writing unit 131 to be turned on, and the second level signal provided by the first input signal terminal IN1 is written to the third node N3 through the third signal writing unit 131, so that the third node signal of the third node N3 is the second level signal to control the third output sub-module 221 to be turned off.

During the fourth period t14, the signal of the first clock signal terminal CK is the second level signal (that is, the disable level), and controls the third signal writing unit 131 to be turned off, and the third node signal of the third node N3 can maintain the second level signal during the third period t13 under the action of the third capacitor C3, so that the third output sub-module 221 is controlled to continue to be turned off.

Further, in the embodiments of the present disclosure, by providing the third signal writing unit 131, the third node N3 is prevented from being electrically connected to the first node N1. When the third node signal jumps to a signal lower than the first level signal at the moment T3, the first node signal of the first node N1 can be prevented from being affected. As shown in FIG. 2, the first node signal of the first node N1 can be the first level signal at the moment T3, which improving the stability of the potential of the first node N1.

Further, with such configuration, the third signal writing unit 131 is electrically connected to the first clock signal terminal CK and the first input signal terminal IN1, so that no new signal terminal is added in the gate driver circuit 10, which simplifies the structure of the gate driver circuit 10.

Optionally, as shown in FIG. 1, FIG. 5, FIG. 7, FIG. 9, FIG. 11, FIG. 13, FIG. 15, FIG. 17, FIG. 19, and FIG. 21, the fifth sub-unit 1113 includes an eighteenth transistor M18, and the eighteenth transistor M18 is electrically connected between the first input signal terminal IN1 and the first node N1 and has a gate electrically connected to the first clock signal terminal CK.

As shown in FIG. 17 and FIG. 21, the third signal writing unit 131 includes a nineteenth transistor M19, and the nineteenth transistor M19 is electrically connected between the first input signal terminal IN1 and the third node N3 and has a gate electrically connected to the first clock signal terminal CK.

Optionally, as shown in FIG. 17 and FIG. 21, the eighteenth transistor M18 and the nineteenth transistor M19 each include a P-type transistor.

Exemplarily, as shown in FIG. 17 and FIG. 21, the gate driver circuit 10 includes a third protection transistor M33, and the third protection transistor M33 is electrically connected between the third signal writing unit 131 and the third node N3 and has a gate electrically connected to the first level signal terminal VGL.

When the third node signal of the third node N3 is coupled to the potential lower than the first level signal by the third capacitor C3 due to the jumping of the third clock signal terminal NCK, the third protection transistor M33 is turned off, so that the third signal writing unit 131 is disconnected from the third node N3, thereby preventing the reliability of the transistor in the third signal writing unit 131 can from being affected.

Exemplarily, as shown in FIG. 1, FIG. 5, FIG. 7, FIG. 9, FIG. 11, FIG. 13, FIG. 15, FIG. 17, FIG. 19, and FIG. 21, the first node N1 includes a third sub-node N11 and a fourth sub-node N12. The first signal writing unit 111 is electrically connected to the third sub-node N11, and the gate of the first output transistor M41 in the first output sub-module 211 is electrically connected to the fourth sub-node N12. The gate driver circuit 10 includes a fourth protection transistor M34, and the fourth protection transistor M34 is electrically connected between the third sub-node N11 and the fourth sub-node N12 and has a gate electrically connected to the first level signal terminal VGL.

As shown in FIG. 2, when the signal of the second clock signal terminal XCK jumps from the second level signal to the first level signal, that is, at a moment T4, the fourth sub-node signal of the fourth sub-node N12 drops from the first level signal to the potential lower than the first level signal due to the coupling of the second capacitor C2. In this case, the fourth protection transistor M34 is turned off, so that the third sub-node signal of the third sub-node N11 can be prevented from dropping to the potential lower than the first level signal, that is, with the fourth protection transistor M34, the potential lower than the first level signal can be prevented from being transmitted between the third sub-node N11 and the fourth sub-node N12, which improves the reliability of in the first signal writing unit 111 electrically connected to the third sub-node N11.

It should be noted that, the third node N3 is electrically connected to the first node N1, and the third node N3 can be electrically connected to the third sub-node N11 or the fourth sub-node N12, which is not limited by the embodiments of the present disclosure.

Figure 22:
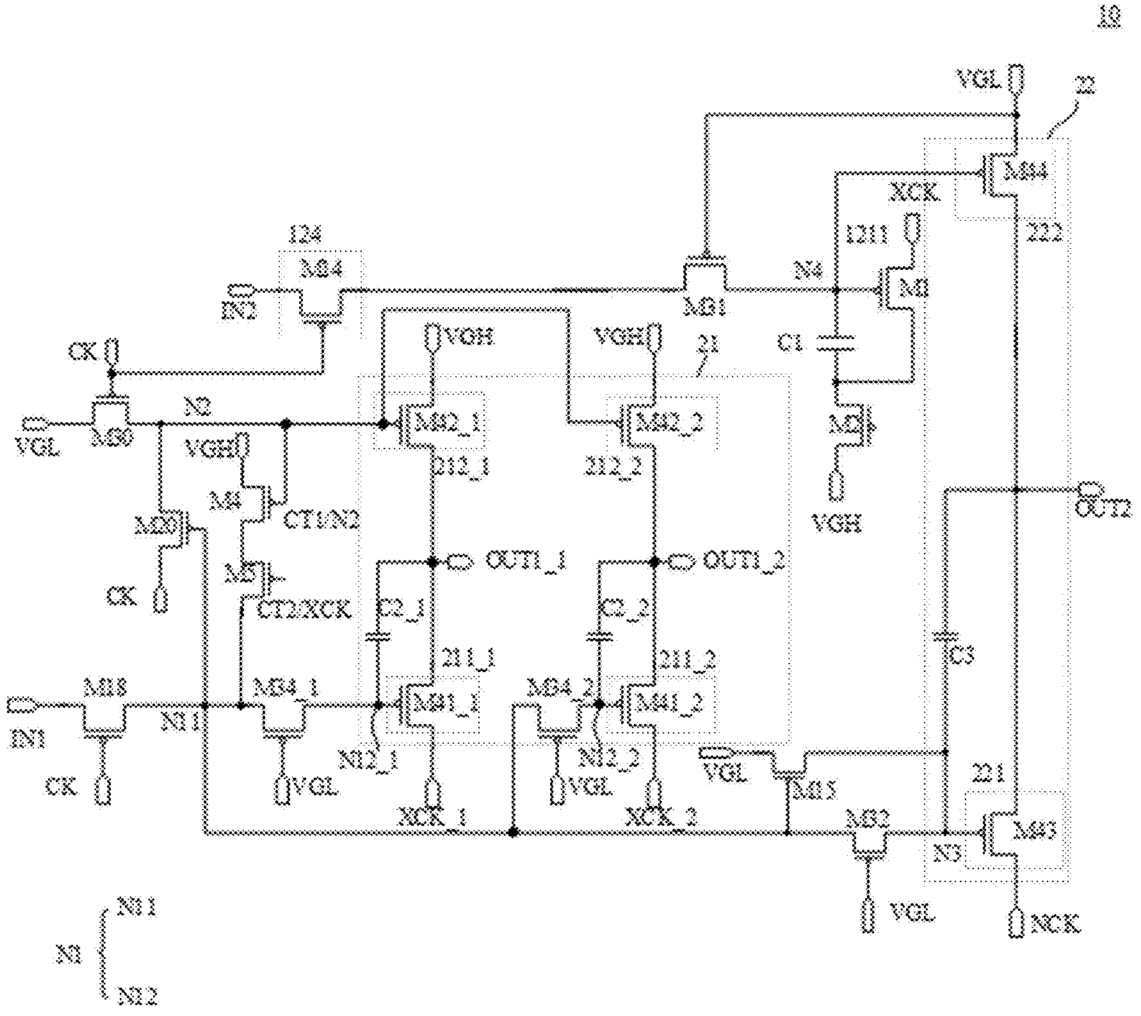
FIG. 22 is another schematic diagram of a gate driver circuit according to some embodiments of the present disclosure.
Figure 23:
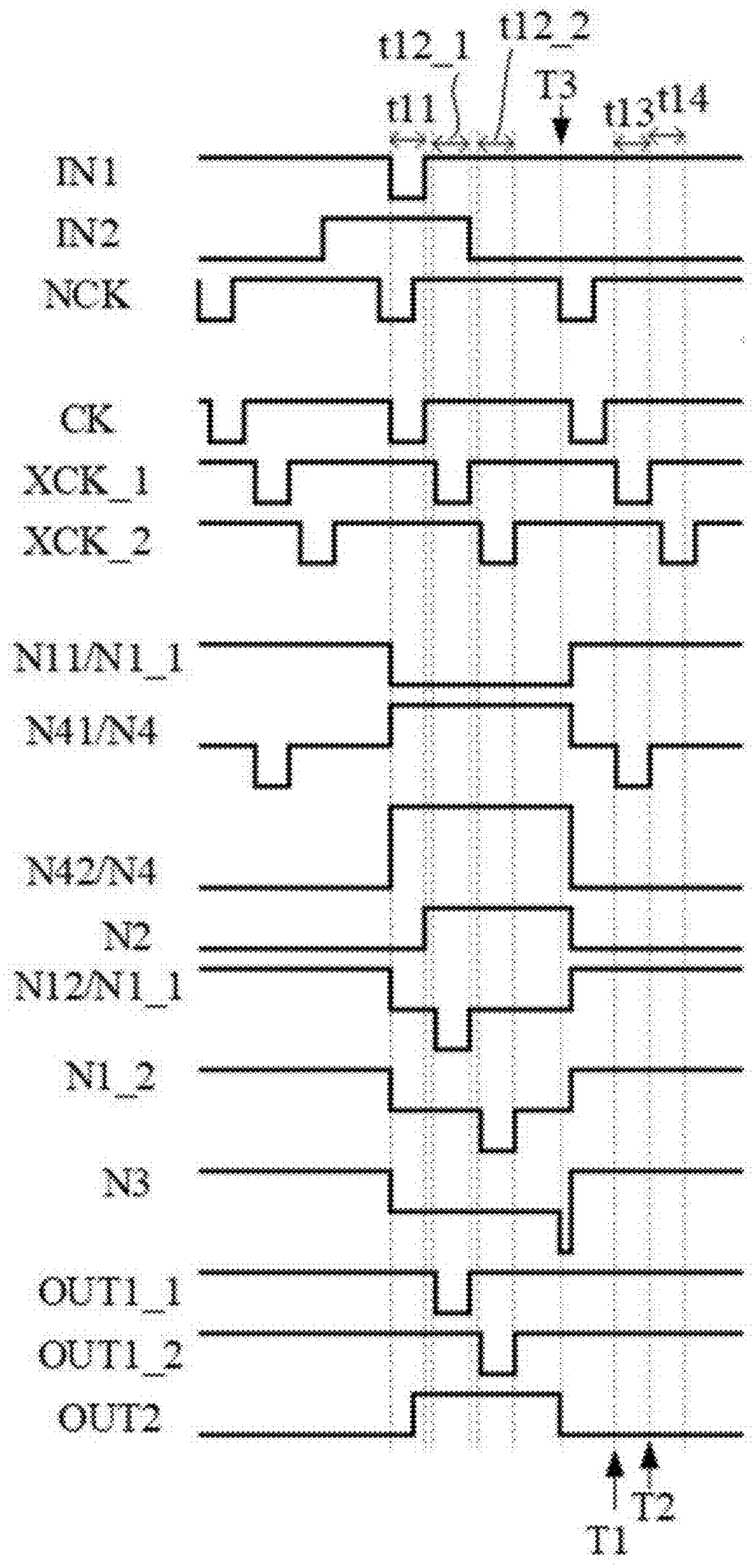
FIG. 23 is a schematic diagram of an operating timing corresponding to FIG. 22.

Exemplarily, as shown in FIG. 22 and FIG. 23 that are respectively another schematic diagram of a gate driver circuit according to some embodiments of the present disclosure and a schematic diagram of an operating timing corresponding to FIG. 22, the first output module 21 includes at least two first output sub-modules and at least two second output sub-modules. The gate driver circuit 10 includes at least two second clock signal terminals and at least two first output terminals. The at least two first output terminals are configured to provide at least two first control signals in a time-division manner, and at least parts of the enable levels of the at least two first control signals do not overlap. In the embodiments of the present disclosure, the at least two first output sub-modules are configured to receive the first node signal, are respectively electrically connected to the at least two second clock signal terminals corresponding to the at least two first output sub-modules, and are respectively electrically the at least two first output terminals corresponding to the at least two first output sub-modules, and the at least two second output sub-modules are configured to receive the second node signal, are electrically connected to the second level signal terminal, and are respectively electrically connected to the at least two first output terminals.

In FIG. 22, two first output sub-modules are distinguished from each other by 211_1 and 211_2, two second output sub-modules are distinguished from each other by 212_1 and 212_2, two second clock signal terminals are distinguished from each other by XCK_1 and XCK_2, and two first output terminals are distinguished from each other by OUT1_1 and OUT1_2.

The first output sub-module 211_1 is electrically connected to the first node N1, the second clock signal terminal XCK_1, and the first output terminal OUT1_1, and under control of the first node signal of the first node N1, the first output sub-module 211_1 is electrically connected to the second clock signal terminal XCK_1 and the first output terminal OUT1_1.

The first output sub-module 211_2 is electrically connected to the first node N1, the second clock signal terminal XCK_2, and the first output terminal OUT1_2, and under control of the first node signal of the first node N1, the first output sub-module 211_2 is electrically connected to the second clock signal terminal XCK_2 and the first output terminal OUT1_2.

The second output sub-module 212_1 is electrically connected to the second node N2, the second level signal terminal VGH, and the first output terminal OUT1_1, and under control of the second node signal of the second node N2, the second output sub-module 212_1 is electrically connected to the second level signal terminal VGH and the first output terminal OUT1_1.

The second output sub-module 212_2 is electrically connected to the second node N2, the second level signal terminal VGH, and the first output terminal OUT1_2, and under control of the second node signal of the second node N2, the second output sub-module 212_2 is electrically connected to the second level signal terminal VGH and the first output terminal OUT1_2.

As shown in FIG. 22, the first output sub-module 211_1 includes a first output transistor M41_1, the first output sub-module 211_2 includes a first output transistor M41_2, and a gate of the first output transistor M41_1 and a gate of the first output transistor M41_2 are electrically connected to the first node N1.

Specifically, as shown in FIG. 22, the gate driver circuit 10 includes two fourth sub-nodes which are labeled as N12_1 and N12_2, respectively. The first output transistor M41_1 is electrically connected between the second clock signal terminal XCK_1 and the first output terminal OUT1_1 and has the gate electrically connected to the fourth sub-node N12_1. The first output transistor M41_2 is electrically connected between the second clock signal terminal XCK_2 and the first output terminal OUT1_2 and has the gate electrically connected to the fourth sub-node N12_2.

Exemplarily, as shown in FIG. 23, the operation process of the gate driver circuit 10 includes the first period t11 and at least two second periods, and FIG. 23 illustrates that the two second periods are t12_1 and t12_2, respectively.

During the second period t12_1, the first node N1 controls two first output transistors M41 to be turned on, the second clock signal terminal XCK_1 is configured to provide the first level signal, the first level signal can be output to the first output terminal OUT1_1 through the first output transistor M41_1 which is turned on, that is, the first output terminal OUT1_1 is configured to output the enable level. The second clock signal terminal XCK_2 is configured to provide the second level signal, the second level signal can be output to the first output terminal OUT1_2 by the other first output transistor M41_2 which is turned on, that is, the first output terminal OUT1_2 is configured to output the disable level.

During the second period t12_2, the first node N1 controls two first output transistors M41 to be turned on, the second clock signal terminal XCK_2 is configured to provide the first level signal, the first level signal can be output to the first output terminal OUT1_2 by the first output transistor M41_2 which is turned on, that is, the first output terminal OUT1_2 is configured to output the enable level. The second clock signal terminal XCK_1 is configured to provide the second level signal, the second level signal can be output to the first output terminal OUT1_1 through the other first output transistor M41_1 which is turned on, that is, the first output terminal OUT1_1 is configured to output the disable level.

Based on such configuration, two pixel driver circuit rows can be driven by one gate driver circuit 10, which simplifies the structure of the gate driver circuit 10.

Exemplarily, as shown in FIG. 22, the first output module 21 includes two second capacitors, one of the two second capacitor is labeled as C2_1, the other one of the two second capacitor is labeled as C2_2, the second capacitor C2_1 is electrically connected to the first output terminal OUT1_1 and the first node N1, and the second capacitor C2_2 is electrically connected to the first output terminal OUT1_2 and the first node N1.

Exemplarily, as shown in FIG. 22, the gate driver circuit 10 includes two fourth protection transistors which are labeled as M34_1 and M34_2, respectively. The fourth protection transistor M34_1 is electrically connected to the third sub-node N11 and the fourth sub-node N12_1, and the fourth protection transistor M34_2 is electrically connected to the third sub-node N11 and the fourth sub-node N12_2.

When configuring the signal of the third clock signal terminal NCK, for example, as shown in FIG. 2, in some embodiments of the present disclosure, the signal of the third clock signal terminal NCK can be the second level signal during the second period t12 and can be the first level signal during the first period t11. Further, a cycle of the signal of the third clock signal terminal NCK can be the same as the cycle of the signal of the first clock signal terminal CK.

Alternatively, as shown in FIG. 23, the third node signal of the third node N3 is the first level signal during each of the second period t12_1 and the second period t12_2; and in some embodiments of the present disclosure, the third clock signal terminal NCK can be configured to provide the second level signal during each of the second period t12_1 and the second period t12_2, so that the second output terminal OUT2 outputs the second control signal, and the enable level of the second control signal is the second level signal provided by the third clock signal terminal NCK.

Based on such configuration, as shown in FIG. 22 and FIG. 23, the second output terminal OUT2 can be configured to output the second level signal during each of the second period t12_1 and the second period t12_2, that is, during at least the second period t12_1, the first control signal output by the first output terminal OUT1_1 can include the first level signal, the first control signal and the second control signal output by the first output terminal OUT1_2 can include the second level signal, and the first control signal output by the first output terminal OUT1_2 can include the first level signal. Further, during at least the second period t12_2, the first control signal output by the first output terminal OUT1_2 can include the first level signal, and the first control signal and the second control signal output by the first output terminal OUT1_1 can include the second level signal; and under a condition that the first control signal and the second control signal can be used to control the transistors with different channel types in the pixel driver circuit, respectively, the first level signal is the enable level of the first control signal, and the second level signal is the enable level of the second control signal, the enable level of the second control signal can at least partially overlap the enable levels of the at least two first control signals, so that the second output terminal OUT2 can be electrically connected to the two pixel driver circuit rows to drive the two pixel driver circuit rows. Further, based on such configuration, there is no need to provide one group of output transistors in the second output module 22 for each of the two pixel driver circuit rows, which simplifies the structure of the gate driver circuit 10.

FIG. 23 illustrates that the pulse width of the enable level of the second control signal output by the second output terminal OUT2 is greater than a sum of the pulse widths of the enable levels of the two first control signals, and the enable level of the second control signal overlaps the enable levels of the two first control signals.

Figure 24:
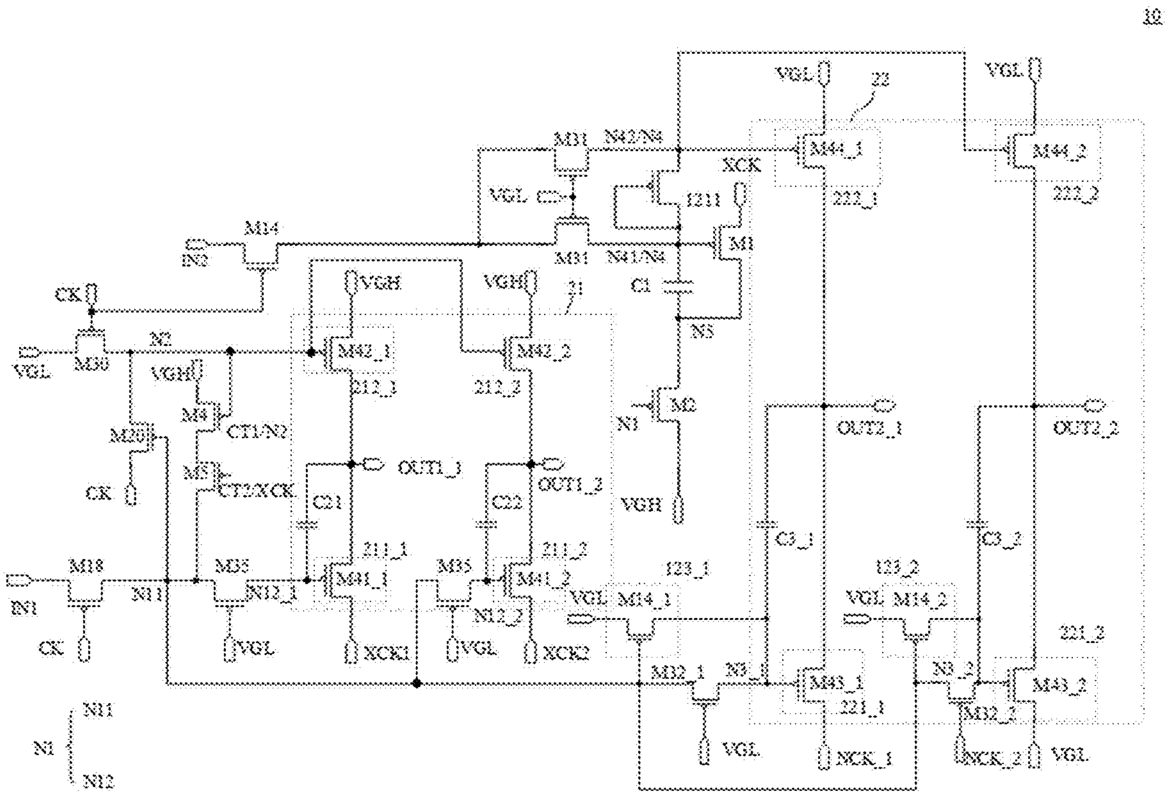
FIG. 24 is another schematic diagram of a gate driver circuit according to some embodiments of the present disclosure.

Optionally, as shown in FIG. 24 that is another schematic diagram of a gate driver circuit according to some embodiments of the present disclosure, the second output module 22 includes at least two third output sub-modules and at least two fourth output sub-modules, and the gate driver circuit 10 includes at least two third clock signal terminals and at least two second output terminals.

In FIG. 24, two third output sub-modules are distinguished from each other by being labeled as 221_1 and 221_2; two fourth output sub-modules are distinguished from each other by being labeled as 222_1 and 222_2; two third clock signal terminals are distinguished from each other by being labeled as NCK_1 and NCK_2; and two second output terminals are distinguished from each other by being labeled as OUT2_1 and OUT2_2.

The third output sub-module 221_1 is electrically connected to the third node N3, the third clock signal terminal NCK_1, and the second output terminal OUT2; under control of the third node signal of the third node N3, the third output sub-module 221_1 is electrically connected to the third clock signal terminal NCK_1 and the second output terminal OUT2_1.

The third output sub-module 221_2 is electrically connected to the third node N3, the third clock signal terminal NCK_2, and the second output terminal OUT2; under control of the third node signal of the third node N3, the third output sub-module 221_2 is electrically connected to the third clock signal terminal NCK_2 and the second output terminal OUT2_2.

The fourth output sub-module 222_1 is electrically connected to the fourth node N4, the first level signal terminal VGL, and the second output terminal OUT2_1; under control of the fourth node signal of the fourth node N4, the fourth output sub-module 222_1 is electrically connected to the first level signal terminal VGL and the second output terminal OUT2_1.

The fourth output sub-module 222_2 is electrically connected to the fourth node N4, the first level signal terminal VGL, and the second output terminal OUT2_2; under control of the fourth node signal of the fourth node N4, the fourth output sub-module 222_2 is electrically connected to the first level signal terminal VGL and the second output terminal OUT2_2.

As shown in FIG. 24, the third output sub-module 221_1 includes a third output transistor M43_1, the third output sub-module 221_2 includes a third output transistor M43_2, and a gate of the third output transistor M43_1 and a gate of the third output transistor M43_2 are electrically connected to the third node N3.

Specifically, as shown in FIG. 24, the gate driver circuit 10 includes two third nodes which are labeled as N3_1 and N3_2, respectively. The third output transistor M43_1 is electrically connected between the third clock signal terminal NCK_1 and the second output terminal OUT2_1 and has the gate electrically connected to the third node N3_1. The third output transistor M43_2 is electrically connected between the third clock signal terminal NCK_2 and the second output terminal OUT2_2 and has the gate electrically connected to the third node N3_2.

Exemplarily, as shown in FIG. 24, the second output module 22 includes two third capacitors which are labeled as C3_1 and C3_2, respectively. The third capacitor C3_1 id electrically connected to the second output terminal OUT1_1 and the third node N3, and the third capacitor C3_2 is electrically connected to the second output terminal OUT2_2 and the third node N3.

Exemplarily, as shown in FIG. 24, the gate driver circuit 10 includes two fourteenth transistors and two second protection transistors, the two fourteenth transistors are labeled as M14_1 and M14_2, respectively, and the two second protection transistors are labeled as M32_1 and M32_2, respectively.

Figure 25:
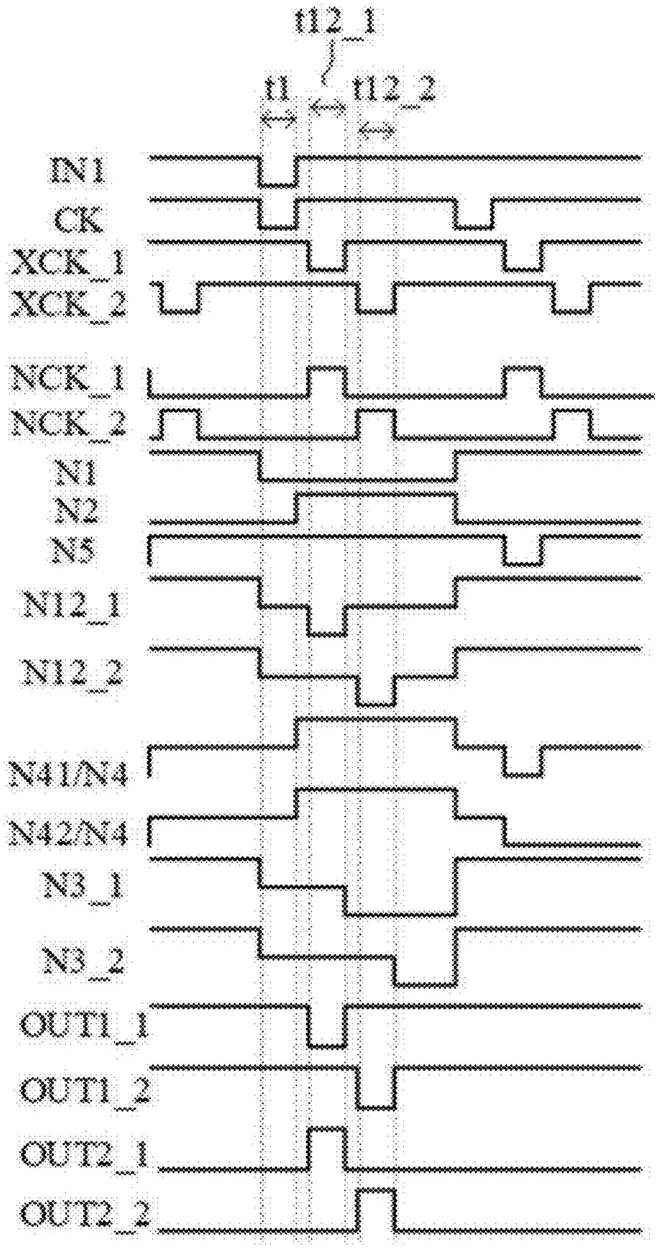
FIG. 25 is a schematic diagram of an operating timing of the gate driver circuit shown in FIG. 24.

Exemplarily, as shown in FIG. 25 that is a schematic diagram of an operating timing of the gate driver circuit shown in FIG. 24, the operation process of the gate driver circuit 10 includes the first period t11 and at least two second periods, and FIG. 25 illustrates that the two second periods are t12_1 and t12_2, respectively.

During the second period t12_1, the third node signal of the third node N3_1 is the first level signal to control the third output transistor M43_1 to be turned on, the third clock signal terminal NCK_1 provides the second level signal, and the second level signal is output to the second output terminal OUT2_1 by the third output transistor M43_1 which is turned on, so that the second output terminal OUT2_1 outputs the enable level; and the third node signal of the third node N3_2 is the first level signal to control the third output transistor M43_2 to be turned on, the third clock signal terminal NCK_2 provides the first level signal, and the first level signal is output to the second output terminal OUT2_2 by the third output transistor M43_2 which is turned on, so that the second output terminal OUT2_2 outputs the disable level.

During the second period t12_2, the third node signal of the third node N3_1 is the first level signal to control the third output transistor M43_1 to be turned on, the third clock signal terminal NCK_1 provides the first level signal, and the first level signal is output to the second output terminal OUT2_1 through the third output transistor M43_1 which is turned on, so that the second output terminal OUT2_1 outputs the disable level; and the third node signal of the third node N3_2 is the first level signal to control the third output transistor M43_2 to be turned on, the third clock signal terminal NCK_2 is configured to provide the second level signal, and the second level signal is output to the second output terminal OUT2_2 through the third output transistor M43_2 which is turned on, so that the second output terminal OUT2_2 is configured to output the enable level.

Figure 26:
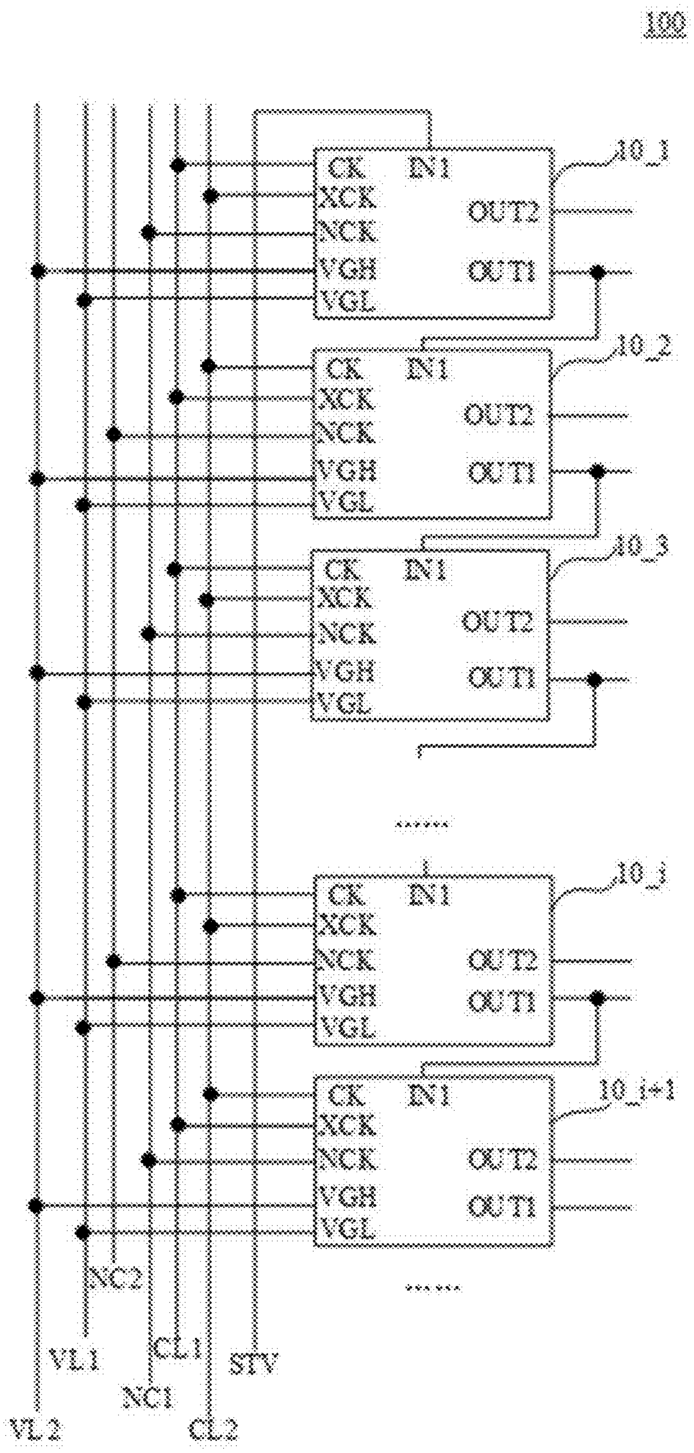
FIG. 26 is a schematic diagram of a shift register according to some embodiments of the present disclosure.

Exemplarily, some embodiments of the present disclosure provide a shift register, and as shown in FIG. 26 that is a schematic diagram of a shift register according to some embodiments of the present disclosure, the shift register 100 includes N gate driver circuits 10 that are cascaded, the first input signal terminal IN1 of the (i+1)-th stage gate driver circuit 10 is configured to receive the signal of the first output terminal OUT1 of the i-th stage gate driver circuit 10, where i is an integer and satisfies $1 \le i \le N-1$.

As shown in FIG. 26, the shift register 100 includes a frame start signal line STV, a first level signal line VL1, a second level signal line VL2, a first clock signal line CL1, a second clock signal line CL2, a third clock signal line NC1, and a fourth clock signal line NC2. The first input signal terminal IN1 of the first stage gate driver circuit 10_1 can be electrically connected to the frame start signal line STV. The timings of the frame start signal line STV, the first clock signal line CL1, the second clock signal line CL2, the third clock signal line NC1, and the fourth clock signal line NC2 are shown in FIG. 27.

In some embodiments of the present disclosure, as shown in FIG. 26, in an odd-numbered stage gate driver circuit 10, the first clock signal terminal CK of is connected to the first clock signal line CL1, the second clock signal terminal XCK is connected to the second clock signal line CL2, and the third clock signal terminal NCK is connected to the third clock signal line NC1; and in an even-numbered stages of gate driver circuit 10, the first clock signal terminal CK is connected to the second clock signal line CL2, the second clock signal terminal XCK is connected to the first clock signal line CL1, and the third clock signal terminal NCK is connected to the fourth clock signal line NC2.

Figure 27:
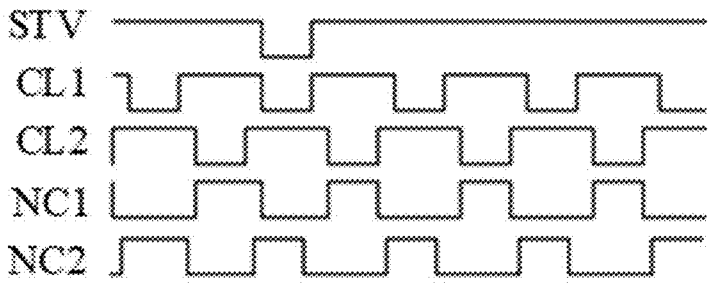
FIG. 27 is a diagram of timings of a frame start signal line, a first clock signal line, a second clock signal line, a third clock signal line, and a fourth clock signal line according to some embodiments of the present disclosure.

As shown in FIG. 27, the signal of the first clock signal line CL1 and the signal of the second clock signal line CL2 have a phase difference, and the signal of the third clock signal line NC1 and the signal of the fourth clock signal line NC2 has a phase difference.

Figure 28:
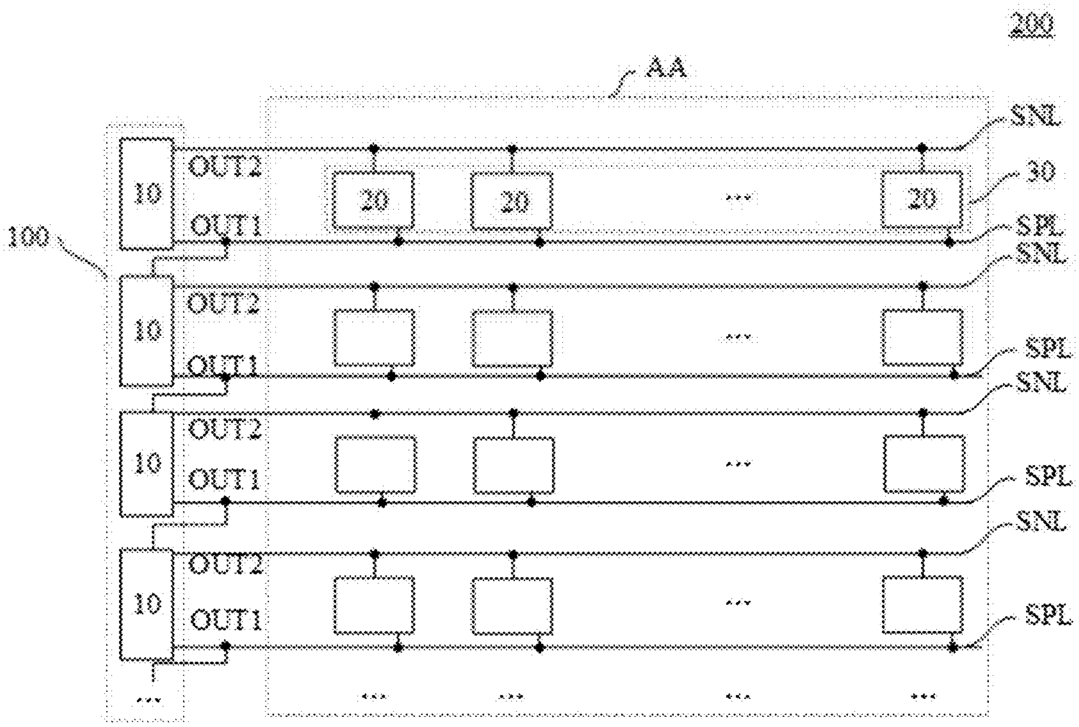
FIG. 28 is a schematic diagram of a display panel according to some embodiments of the present disclosure.

Some embodiments of the present disclosure provide a display panel, as shown in FIG. 28 that is a schematic diagram of a display panel according to some embodiments of the present disclosure. The display panel 200 includes the shift register 100, and the shift register 100 includes a plurality of gate driver circuits 10 that are cascaded.

As shown in FIG. 28, the display panel 200 includes a plurality of pixel driver circuit rows 30, a plurality of first scanning lines SPL, and a plurality of second scanning lines SNL. The pixel driver circuit row 30 includes a plurality of pixel driver circuits 20. The pixel driver circuits 20 can be provided as shown in FIG. 3.

Exemplarily, the first scanning line SPL is electrically connected to the first output terminal OUT1 of the gate driver circuit 10 to receive the first control signal. The second scanning line SNL is electrically connected to the second output terminal OUT2 of the gate driver circuit 10 to receive the second control signal. Further, the first scanning line SPL is electrically connected to a gate of a first pixel transistor (for example, the data writing transistor T12) of the pixel driver circuit 20 shown in FIG. 3, and the data writing transistor T12 is configured to receive a data signal. The second scanning line SNL is electrically connected to a gate of a second pixel transistor (for example, the threshold compensation transistor T13 or the gate reset transistor T11) of the pixel driver circuit 20 shown in FIG. 3. The gate reset transistor T11 is configured to receive the first reset signal, and the threshold compensation transistor T13 is electrically connected to the second electrode and the gate of the driving transistor Tm.

For example, in some embodiments of the present disclosure, the gate of the threshold compensation transistor T13 of the pixel driver circuit 20 (that is, the third scanning control terminal SN2) can be electrically connected to the second output terminal OUT2 of the current stage gate driver circuit 10, and the gate of the gate reset transistor T11 in the pixel driver circuit 20 (that is, the first scanning control terminal SN1) can be electrically connected to the second output terminal OUT2 of the previous stage gate driver circuit 10.

The gate of the data writing transistor T12 in the pixel driver circuit 20 (that is, the second scanning control terminal SP) can be electrically connected to the first output terminal OUT1 of the current stage gate driver circuit 10.

Figure 29:
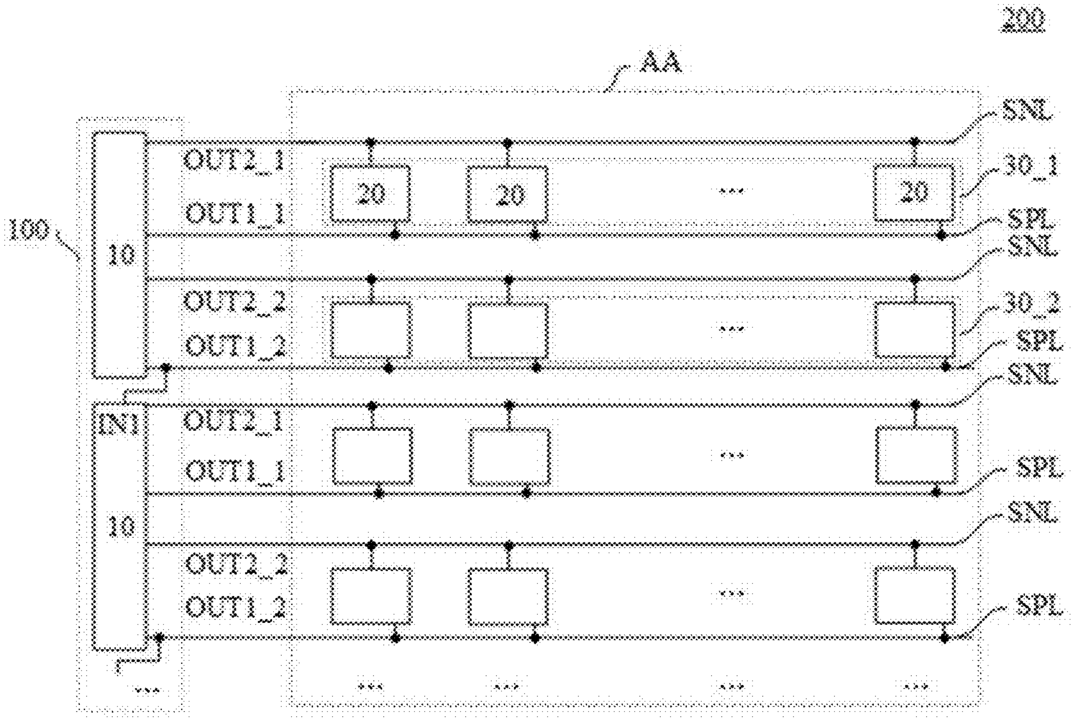
FIG. 29 is another schematic diagram of a display panel according to some embodiments of the present disclosure.

Optionally, under a condition that the gate driver circuit 10 includes two first output sub-modules, two second output sub-modules, two first output terminals OUT1, and two second output terminals OUT2 in the manner shown in FIG. 24, as shown in FIG. 29 that is another schematic diagram of a display panel according to some embodiments of the present disclosure, one stage gate driver circuit 10 can be electrically connected to two pixel driver circuit rows 30. Specifically, as shown in FIG. 29, in the gate driver circuit 10, the first output terminal OUT1_1 and the second output terminal OUT2_1 are electrically connected to the pixel driver circuit row 30_1, and the first output terminal OUT1_2 and the second output terminal OUT2_2 are electrically connected to the pixel driver circuit row 30_2.

Optionally, as shown in FIG. 22, under a condition that the gate driver circuit 10 includes two first output sub-modules, two second output sub-modules, two first output terminals OUT1, and two second output terminals OUT2 in the manner shown in FIG. 15, the first output terminal OUT1_2 of the current stage gate driver circuit 10 can be electrically connected to the first input signal terminal IN1 of the next stage gate driver circuit 10.

Some embodiments of the present disclosure provide a method for driving a gate driver circuit, applied to the gate driver circuit 10. As shown in FIG. 1 and FIG. 2, the method for driving the gate driver circuit includes:

during the first period t11, providing the first level signal to the first input signal terminal IN1, the first clock signal terminal CK, and the third clock signal terminal NCK, and providing the second level signal to the second clock signal terminal XCK, so that the first output terminal OUT1 outputs the second level signal and the second output terminal OUT2 outputs the first level signal; and during the second period t12, providing the second level signal to the first input signal terminal IN1, the first clock signal terminal CK, and the third clock signal terminal NCK, and providing the first level signal to the second clock signal terminal XCK, so that the first output terminal OUT1 outputs the first level signal and the second output terminal OUT2 outputs the second level signal.

Figure 30:
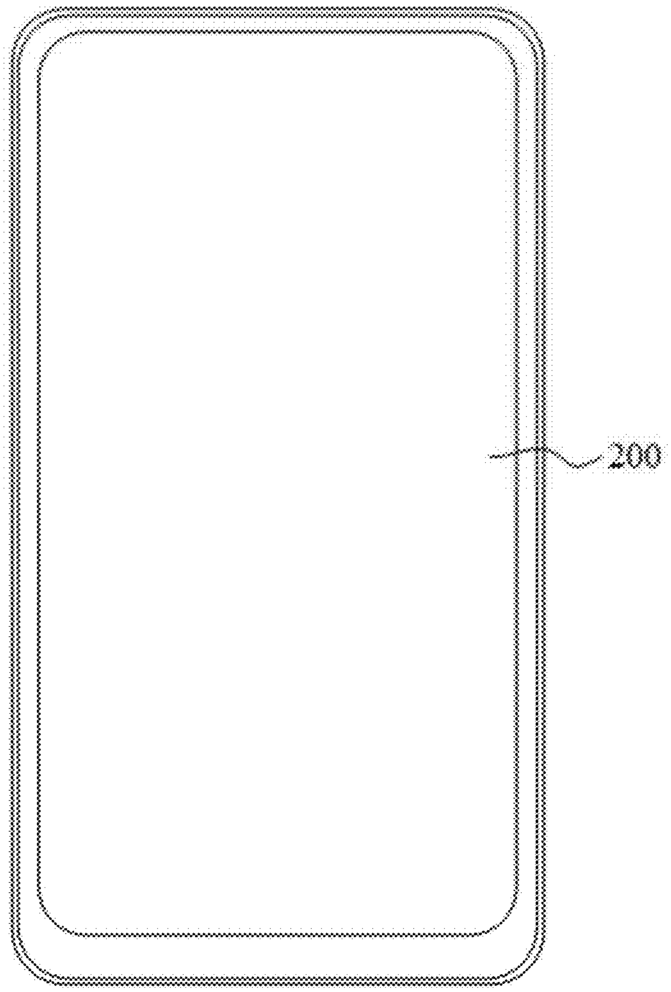
FIG. 30 is a schematic diagram of a display apparatus according to some embodiments of the present disclosure.

Based on a same inventive concept, some embodiments of the present disclosure provide a display apparatus, as shown in FIG. 30 that is a schematic diagram of a display apparatus according to some embodiments of the present disclosure. The display apparatus includes the display panel 200. The specific structure of the display panel 200 has been described in detail in the above embodiments, which is not repeated herein. Of course, the display apparatus shown in FIG. 30 is merely an example, and can be any device having a display function, such as, a mobile phone, a tablet computer, a notebook computer, an e-book, a television, and a smart watch, which is not limited by the embodiments of the present disclosure.

The above description presents merely exemplary embodiments of the present disclosure, and is not intended to limit the present disclosure, and any modifications, equivalents, and improvements made within the spirit and the principle of the present disclosure should fall within the protection scope of the present disclosure.

What is claimed is:

1. A gate driver circuit comprising:

a first driving circuit electrically connected to a first clock signal terminal, a first input signal terminal, and a first level signal terminal, and configured to output a first node signal of a first node and a second node signal of a second node based on a signal of the first clock signal terminal, a signal of the first input signal terminal, and a signal of the first level signal terminal;

a first output circuit comprising a first output sub-circuit, a second output sub-circuit, and a first output terminal, the first output sub-circuit being configured to receive the first node signal and being electrically connected to a second clock signal terminal and the first output terminal, the second output sub-circuit being configured to receive the second node signal and being electrically connected to a second level signal terminal and the first output terminal, and the first output terminal being configured to provide a first control signal; and a second output circuit comprising a third output sub-circuit, a fourth output sub-circuit, and a second output terminal, the third output sub-circuit being configured to receive a third node signal of a third node and being electrically connected to a third clock signal terminal and the second output terminal, the fourth output sub-circuit being configured to receive a fourth node signal of a fourth node and being electrically connected to the first level signal terminal and the second output terminal, and the second output terminal being configured to provide a second control signal, wherein at at least one moment, one of the first control signal and the second control signal comprises a first level signal, and the other of the first control signal and the second control signal comprises a second level signal.

2. The gate driver circuit according to claim 1, further comprising:

a second driving circuit electrically connected to a second input signal terminal and the fourth node.

3. The gate driver circuit according to claim 2, wherein the second driving circuit comprises:

a first adjustment unit electrically connected to the second clock signal terminal and the fourth node and configured to adjust the fourth node signal of the fourth node based on a signal of the second clock signal terminal.

4. The gate driver circuit according to claim 3, wherein the first adjustment unit comprises:

a first capacitor comprising a first electrode plate, and a second electrode plate electrically connected to the fourth node; and a first transistor electrically connected between the second clock signal terminal and the first electrode plate of the first capacitor and comprising a gate electrically connected to the fourth node.

5. The gate driver circuit according to claim 4, wherein the second driving circuit further comprises:

a second adjustment unit configured to receive the first node signal and electrically connected to the second level signal terminal and the first electrode plate of the first capacitor.

6. The gate driver circuit according to claim 5, wherein the second adjustment unit comprises:

a second transistor electrically connected between the first level signal terminal and the first electrode plate of the first capacitor, and comprising a gate electrically connected to the first node.

7. The gate driver circuit according to claim 3, wherein the second input signal terminal is electrically connected to the second node.

8. The gate driver circuit according to claim 7, wherein when the first node is at an enable level, the second node is at a disable level.

9. The gate driver circuit according to claim 8, wherein the first driving circuit comprises:

a second signal writing unit which is electrically connected to a fourth clock signal terminal, the first level signal terminal, the first node, and the second node, and which is configured to output the second node signal to the second node based on a signal of the fourth clock signal terminal and a signal of the first level signal terminal, and is configured to output the second node signal to the second node based on the first node signal of the first node and the signal of the fourth clock signal terminal.

10. The gate driver circuit according to claim 9, wherein the second signal writing unit comprises:

an eleventh transistor electrically connected between the fourth clock signal terminal and the second node, and comprising a gate electrically connected to the first node; and a twelfth transistor electrically connected between the first level signal terminal and the second node, and comprising a gate electrically connected to the fourth clock signal terminal.

11. The gate driver circuit according to claim 9, wherein the first driving circuit comprises:

a first signal writing unit comprising a second sub-unit, the second sub-unit being configured to receive the second node signal and being electrically connected to the second level signal terminal and the first node.

12. The gate driver circuit according to claim 11, wherein the second sub-unit comprises:

a thirteenth transistor electrically connected between the second level signal terminal and the first node and comprising a gate electrically connected to the second node.

13. The gate driver circuit according to claim 2, wherein the second output circuit further comprises:

a first protection transistor electrically connected between the second input signal terminal and the fourth node and comprising a gate electrically connected to the first level signal terminal.

14. The gate driver circuit according to claim 1, further comprising:

a third signal writing unit electrically connected to the first clock signal terminal and the first input signal terminal, and configured to output the third node signal to the third node based on the signal of the first clock signal terminal and the signal of the first input signal terminal, wherein the first driving circuit comprises a first signal writing unit comprising a fifth sub-unit, the fifth sub-unit being electrically connected to the first clock signal terminal and the first input signal terminal and being configured to output the first node signal to the first node based on the signal of the first clock signal terminal and the signal of the first input signal terminal.

15. The gate driver circuit according to claim 14, wherein the fifth sub-unit comprises an eighteenth transistor electrically connected between the first input signal terminal and the first node and comprising a gate electrically connected to the first clock signal terminal; and the third signal writing unit comprises a nineteenth transistor electrically connected between the first input signal terminal and the third node and comprising a gate electrically connected to the first clock signal terminal.

16. The gate driver circuit according to claim 14, further comprising:

a third protection transistor electrically connected between the third signal writing unit and the third node and comprising a gate electrically connected to the second level signal terminal.

17. The gate driver circuit according to claim 1, further comprising:

a first signal writing unit and a fourth protection transistor, wherein the first node comprises a third sub-node and a fourth sub-node, the first signal writing unit is electrically connected to the third sub-node, and the first output sub-circuit is electrically connected to the fourth sub-node electrically connected between the third sub-node and the fourth sub-node and comprises a gate electrically connected to the second level signal terminal.

18. The gate driver circuit according to claim 1, wherein the first output sub-circuit comprises a first output transistor electrically connected between the second clock signal terminal and the first output terminal and comprising a gate electrically connected to the first node;

the second output sub-circuit comprises a second output transistor electrically connected between the second level signal terminal and the first output terminal and comprising a gate electrically connected to the second node;

the first output circuit further comprises a second capacitor electrically connected to the first node and the first output terminal;

the third output sub-circuit comprises a third output transistor electrically connected between the third clock signal terminal and the second output terminal and comprising a gate electrically connected to the third node;

the fourth output sub-circuit comprises a fourth output transistor electrically connected between the first level signal terminal and the second output terminal and comprising a gate electrically connected to the fourth node; and the second output circuit further comprises a third capacitor electrically connected to the third node and the second output terminal.

19. The gate driver circuit according to claim 1, wherein the first output circuit comprises at least two of the first output sub-circuits and at least two of the second output sub-circuits;

the gate driver circuit comprises at least two of the second clock signal terminals and at least two of the first output terminals, the at least two of the first output terminals being configured to provide at least two of the first control signals in a time-division manner;

the at least two of the first output sub-circuits are configured to receive the first node signal, are respectively electrically connected to the at least two of the second clock signal terminals corresponding to the at least two of the first output sub-circuits, and are respectively electrically the at least two of the first output terminals corresponding to the at least two of the first output sub-circuits; and the at least two of the second output sub-circuits are configured to receive the second node signal, are respectively electrically connected to the at least two of the second level signal terminals, and are respectively electrically connected to the at least two of the first output terminals.

20. A display panel, comprising:

a pixel driver circuit, comprising:

a driving transistor, a first pixel transistor electrically connected to a first electrode of the driving transistor, and a second pixel transistor electrically connected to a gate of the driving transistor, the first pixel transistor comprising a P-type transistor, and the second pixel transistor comprising an N-type transistor; and a gate driver circuit, comprising:

a first driving circuit electrically connected to a first clock signal terminal, a first input signal terminal, and a first level signal terminal, and configured to output a first node signal of a first node and a second node signal of a second node based on a signal of the first clock signal terminal, a signal of the first input signal terminal, and a signal of the first level signal terminal, a first output circuit comprising a first output sub-circuit, a second output sub-circuit, and a first output terminal, the first output sub-circuit being configured to receive the first node signal and being electrically connected to a second clock signal terminal and the first output terminal, the second output sub-circuit being configured to receive the second node signal and being electrically connected to a second level signal terminal and the first output terminal, and the first output terminal being configured to provide a first control signal, and a second output circuit comprising a third output sub-circuit, a fourth output sub-circuit, and a second output terminal, the third output sub-circuit being configured to receive a third node signal of a third node and being electrically connected to a third clock signal terminal and the second output terminal, the fourth output sub-circuit being configured to receive a fourth node signal of a fourth node and being electrically connected to the first level signal terminal and the second output terminal, and the second output terminal being configured to provide a second control signal;

wherein at at least one moment, one of the first control signal and the second control signal comprises a first level signal, and the other of the first control signal and the second control signal comprises a second level signal; and a gate of the first pixel transistor is configured to receive the first control signal, and a gate of the second pixel transistor is configured to receive the second control signal.

* * * * *